US009956706B2

(12) United States Patent
Mogi et al.

(10) Patent No.: US 9,956,706 B2
(45) Date of Patent: *May 1, 2018

(54) METHOD OF MANUFACTURE OF SEAT PAD

(71) Applicants: TOYO TIRE & RUBBER CO., LTD., Osaka-shi, Osaka (JP); TACHI-S CO., LTD., Akishima-shi, Tokyo (JP)

(72) Inventors: Manabu Mogi, Osaka (JP); Yu Sasaki, Osaka (JP); Junpei Yoshikawa, Osaka (JP); Jun Takano, Osaka (JP); Shogo Suzuki, Osaka (JP)

(73) Assignees: TOYO TIRE & RUBBER CO., LTD., Osaka-shi (JP); TACHI-S CO., LTD., Tokyo (JP)

( * ) Notice: Subject to any disclaimer, the term of this patent is extended or adjusted under 35 U.S.C. 154(b) by 15 days.

This patent is subject to a terminal disclaimer.

(21) Appl. No.: 14/562,874

(22) Filed: Dec. 8, 2014

(65) Prior Publication Data

US 2015/0158214 A1 Jun. 11, 2015

(30) Foreign Application Priority Data

Dec. 11, 2013 (JP) .................................. 2013-255693

(51) Int. Cl.
*B29C 33/12* (2006.01)
*B29C 39/10* (2006.01)
(Continued)

(52) U.S. Cl.
CPC .......... *B29C 44/1276* (2013.01); *B29C 33/12* (2013.01); *B29C 39/10* (2013.01);
(Continued)

(58) Field of Classification Search
CPC .................. B29C 44/1261; B29C 44/1276
See application file for complete search history.

(56) References Cited

U.S. PATENT DOCUMENTS 3,691,569 A * 9/1972 Ikada ................... A47C 23/00
                                                                             277/936
5,630,240 A * 5/1997 Matsuoka ................ A47C 7/18
                                                                   297/452.25
(Continued)

FOREIGN PATENT DOCUMENTS

CN         102413738 A     4/2012
JP          46-26432 Y     9/1971
(Continued)

OTHER PUBLICATIONS

Office Action dated Aug. 2, 2016, issued in counterpart Chinese application No. 201410710298.5, with English translation (10 pages).

(Continued)

*Primary Examiner* — Matthew Daniels
*Assistant Examiner* — Patrick Butler
(74) *Attorney, Agent, or Firm* — Westerman, Hattori, Daniels & Adrian, LLP

(57) ABSTRACT

A three-dimensional mesh-like body is disposed on a molding face of a lower mold onto which a liquid raw material of flexible foam is poured. An upper mold is laid over the lower mold to form a cavity, a projection projected on the upper mold toward the cavity is contacted with the three-dimensional mesh-like body, and the three-dimensional mesh-like body is fixed. The three-dimensional mesh-like body is attached and fixed to a front surface of a pad main body, so that the three-dimensional mesh-like body can be prevented from being displaced with respect to the pad main body. Moreover, the position of the three-dimensional mesh-like body can be prevented from being displaced in the process of foaming the liquid raw material because of the projection, and a vent hole can be formed on the pad main body. As a result, a sweaty feeling can be suppressed.

3 Claims, 11 Drawing Sheets

(51) Int. Cl.
*B29C 44/12* (2006.01)
*A47C 7/02* (2006.01)
*A47C 7/18* (2006.01)
*A47C 27/14* (2006.01)
*A47C 27/22* (2006.01)
*B29K 75/00* (2006.01)
*B29K 105/04* (2006.01)
*B29K 105/08* (2006.01)
*B29L 31/58* (2006.01)
*B60N 2/56* (2006.01)
*B29L 31/00* (2006.01)
*B29K 105/00* (2006.01)

(52) U.S. Cl.
CPC ............ *B29C 44/1261* (2013.01); *A47C 7/02* (2013.01); *A47C 7/18* (2013.01); *A47C 27/142* (2013.01); *A47C 27/22* (2013.01); *B29K 2075/00* (2013.01); *B29K 2105/0058* (2013.01); *B29K 2105/04* (2013.01); *B29K 2105/0809* (2013.01); *B29K 2105/0854* (2013.01); *B29K 2713/00* (2013.01); *B29L 2031/58* (2013.01); *B29L 2031/771* (2013.01); *B60N 2/5664* (2013.01)

(56) References Cited

U.S. PATENT DOCUMENTS

| 8,864,238 | B2 | 10/2014 | Oota et al. |
| 2013/0214583 | A1 | 8/2013 | Uramichi et al. |

FOREIGN PATENT DOCUMENTS

| JP | 61-233513 A | | 10/1986 |
| JP | 01-110914 A | | 4/1989 |
| JP | H1-104247 U | * | 7/1989 |
| JP | H01-104247 U | | 7/1989 |
| JP | 2007-307232 A | | 11/2007 |
| JP | 2008-22982 A | | 2/2008 |
| JP | 2012-115515 A | | 6/2012 |
| JP | 2014-79318 A | | 5/2014 |

OTHER PUBLICATIONS

Non-Final Office Action dated Oct. 25, 2016, issued in U.S. Appl. No. 14/562,868 (14 pages).
Decision of Refusal dated Aug. 1, 2017, issued in counterpart Japanese Application No. 2013-255693, with English translation. (7 pages).
Office Action dated May 23, 2017, issued in Japanese Application No. 2013-255702, with English translation. (10 pages).
Office Action dated Mar. 20, 2017, issued in Chinese Application No. 201410710298.5, with English translation. (17 pages).
Office Action dated May 23, 2017, issued in counterpart Japanese Application No. 2013-255693, with English translation. (9 pages).
Office Action dated Mar. 10, 2017, issued in counterpart Chinese Application No. 201410710722.6, with English translation. (17 pages).
Office Action dated Oct. 13, 2017, issued in related Chinese Application No. 201410710298.5, with English translation. (11 pages).

* cited by examiner

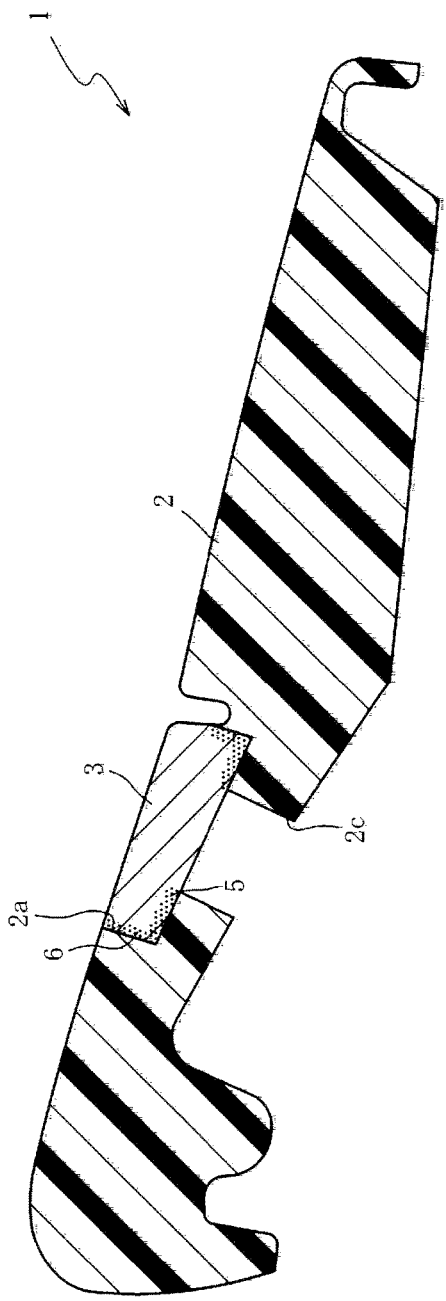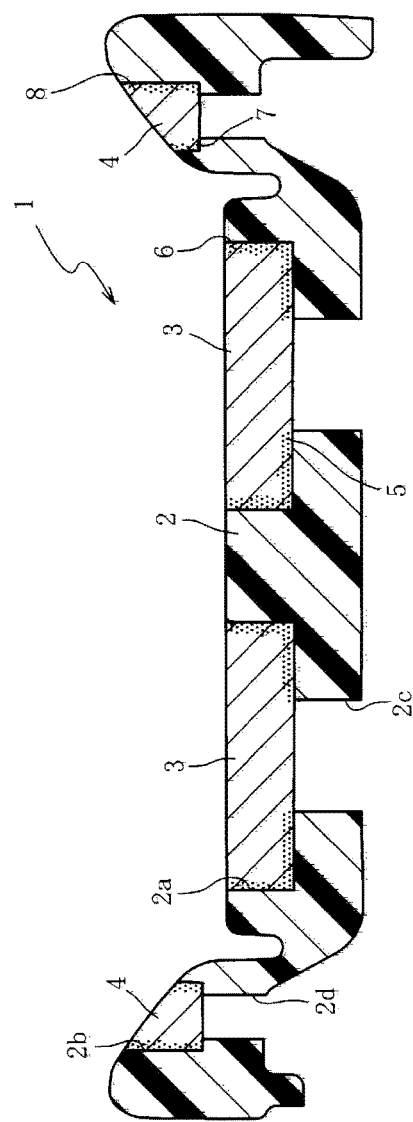
FIG. 2A
FIG. 2B

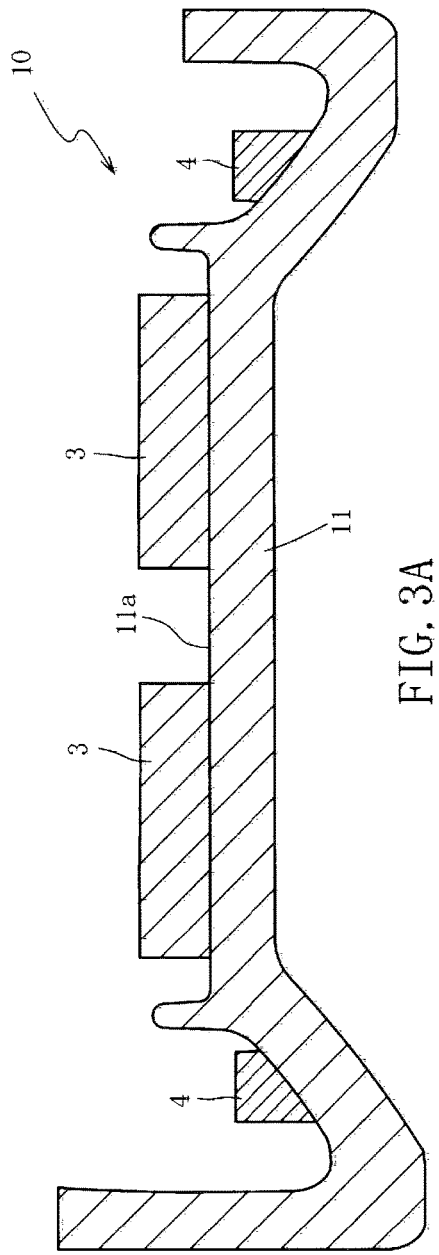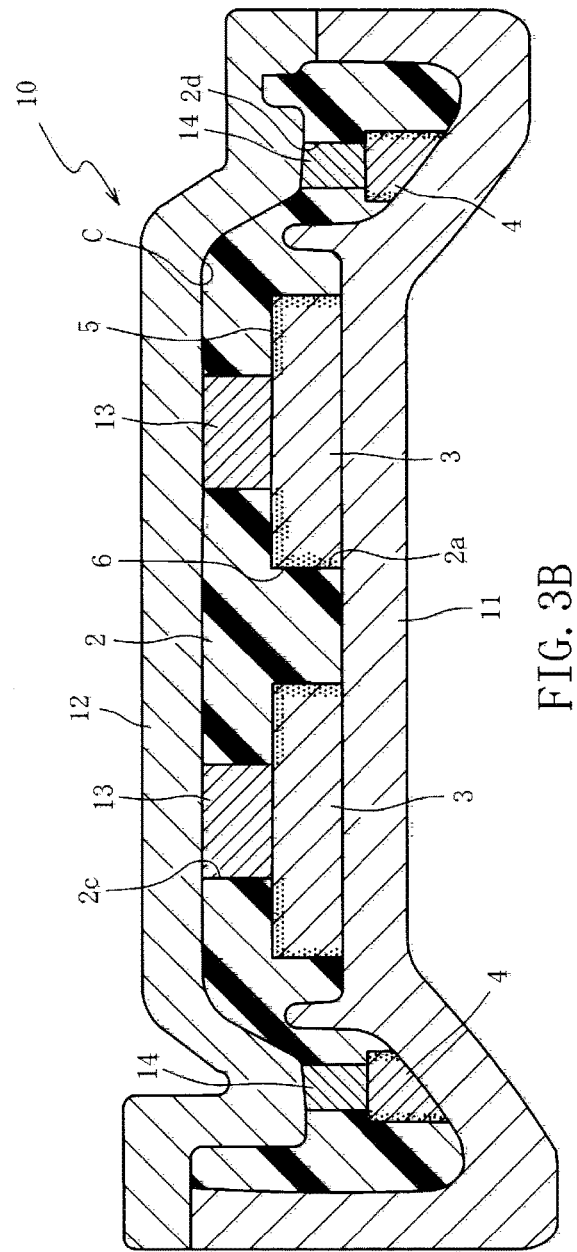
FIG. 3A
FIG. 3B

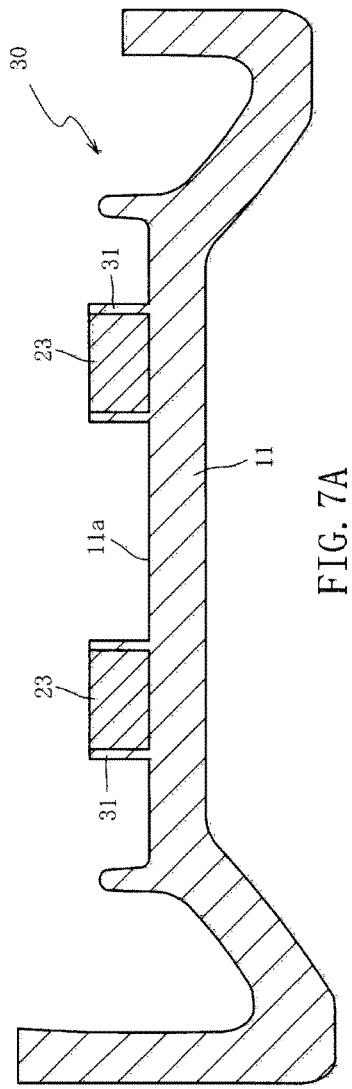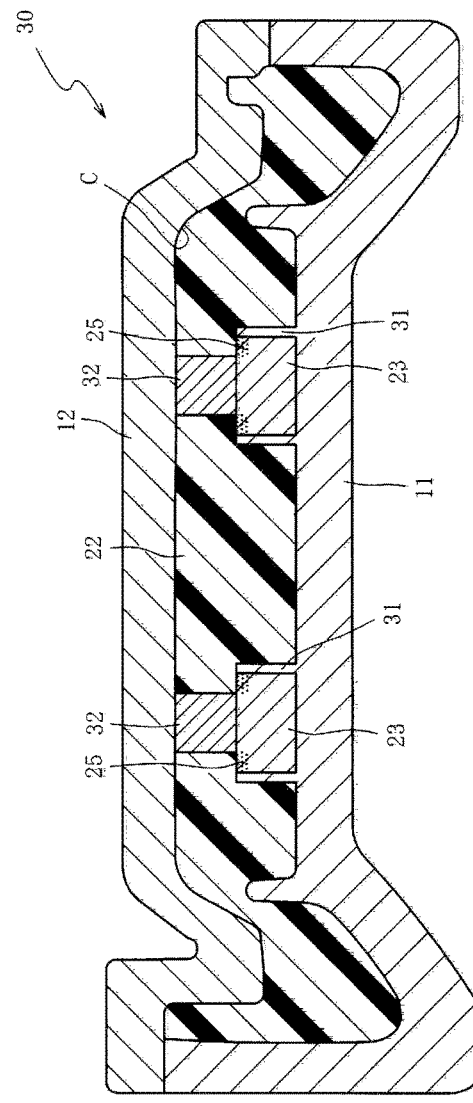
FIG. 7A
FIG. 7B

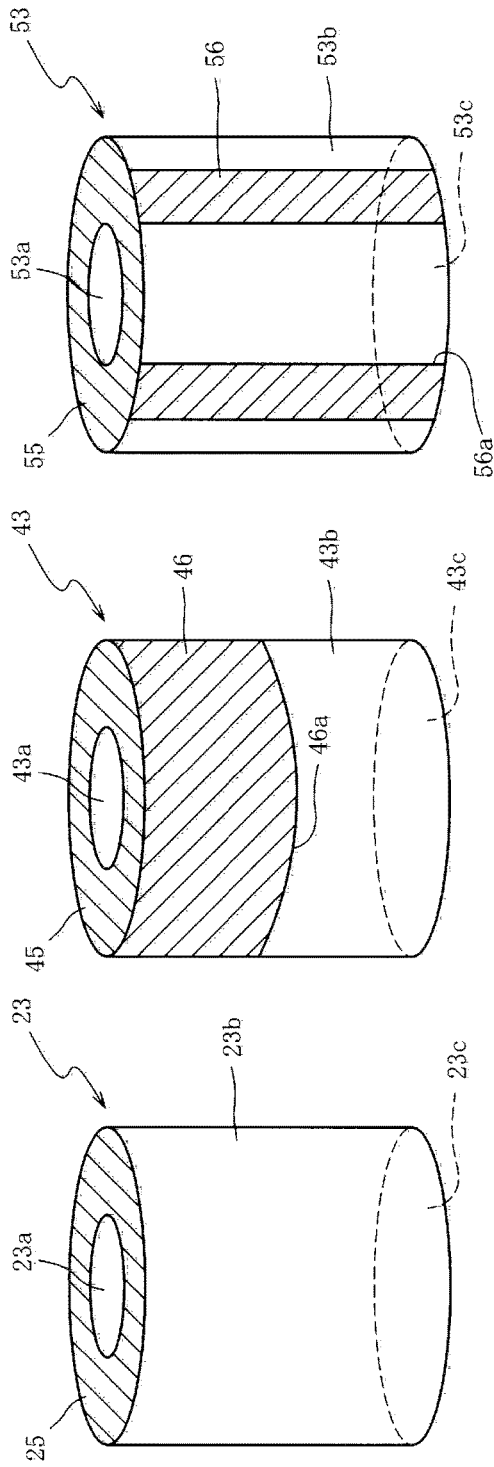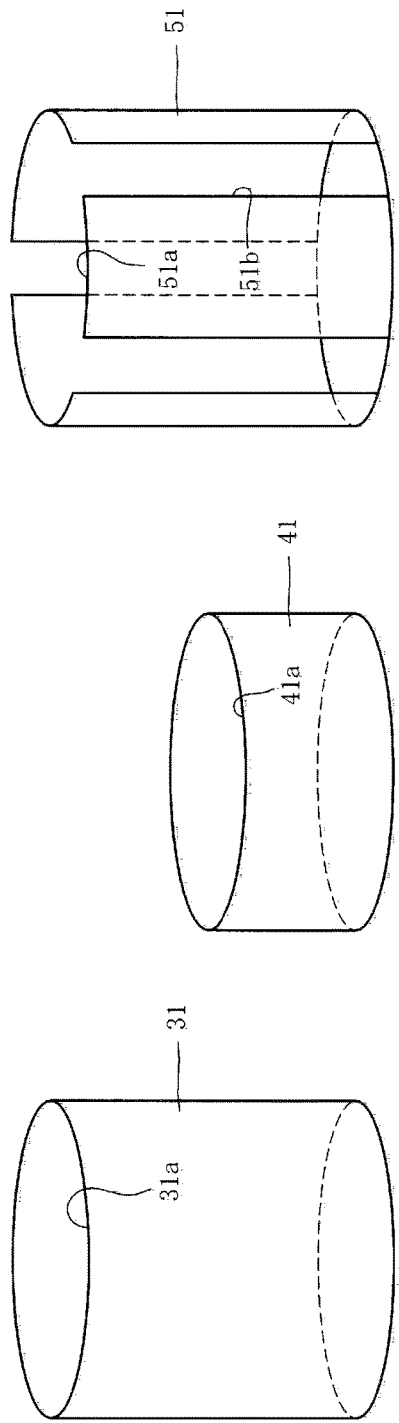

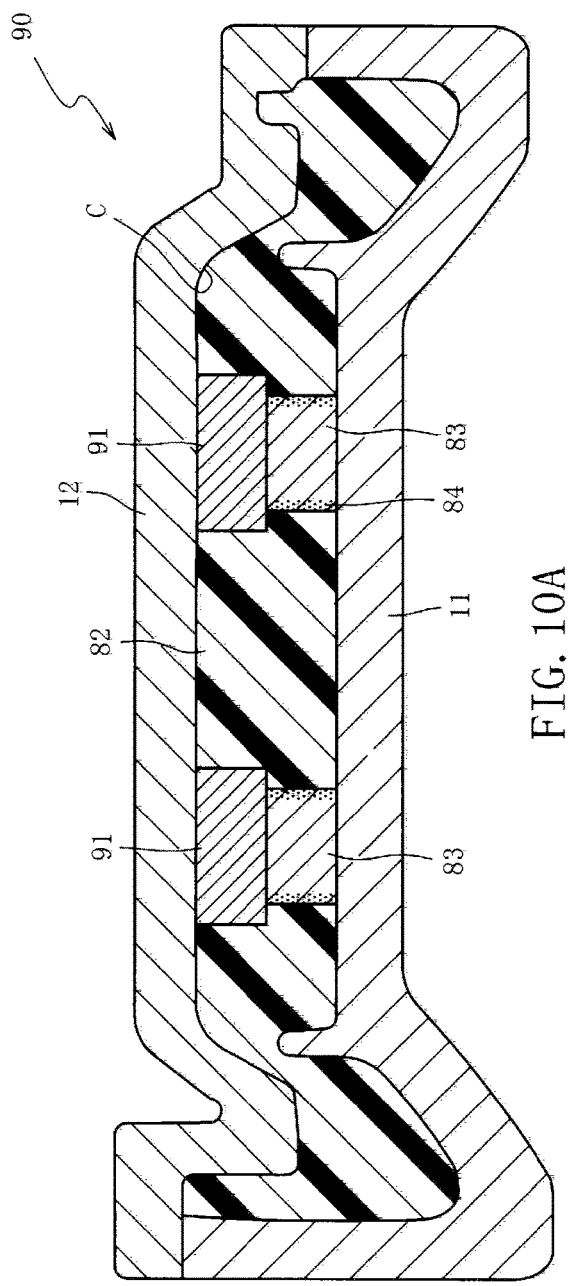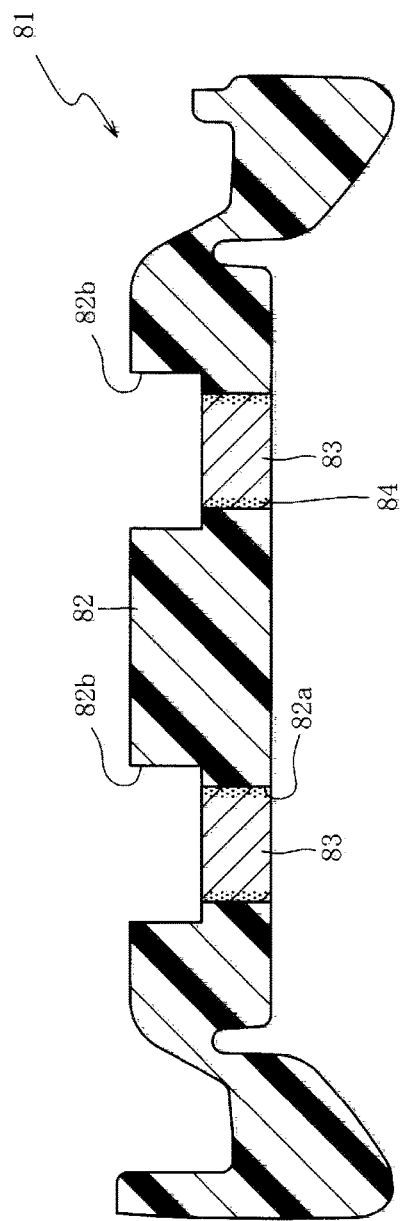
FIG. 10A
FIG. 10B

METHOD OF MANUFACTURE OF SEAT PAD

TECHNICAL FIELD

The present invention relates to a method of manufacture of a seat pad.

BACKGROUND ART

Since a seat pad used for seats and chairs provided on vehicles such as cars, ships, and aircrafts is demanded to have a cushioning property as well as a vibration absorbing property, synthetic resin flexible foam such as flexible urethane foam is used. However, since the flexible foam has a low air permeability, sweat coming from a person who takes a seat is prone to cause a sweaty feeling. Therefore, there is a technique in which a recess that communicates with a vent hole is formed on the front surface of a pad main body made of flexible foam, a three-dimensional mesh-like body in the same dimensions as the dimensions of the recess is fit into the recess, and a seat pad is manufactured (Patent Literature 1). In the technique disclosed in Patent Literature 1, the three-dimensional mesh-like body is formed of a plurality of three-dimensionally entangled fibers, so that the air permeability of the seat pad in the thickness direction is secured using the three-dimensional mesh-like body and the vent hole, and a sweaty feeling experienced by a person who takes a seat can be suppressed.

CITATION LIST

Patent Literature

[Patent Literature 1] Japanese Unexamined Patent Application Publication No. 2012-115515 (specifically in FIG. 4)

SUMMARY OF INVENTION

Technical Problem

However, in the technique described above, since the three-dimensional mesh-like body is simply fit into the recess formed on the front surface of the pad main body, a problem arises in that when the rolling of a vehicle is transmitted to the seat pad in the state in which a person is seated on the seat, the three-dimensional mesh-like body is easily displaced with respect to the pad main body in the recess and comfortableness to sit is degraded.

The present invention is made in order to solve the problem described above, and it is an object to provide a method of manufacture of a seat pad that can obtain a seat pad in which a three-dimensional mesh-like body is not easily displaced with respect to a pad main body while suppressing a sweaty feeling.

Solution to Problem and Advantageous Effects of Invention

In order to achieve the object, in accordance with a method of manufacture of a seat pad according to a first aspect of the invention, in the step of disposing a mesh-like body, a three-dimensional mesh-like body formed of a plurality of three-dimensionally entangled fibers is disposed on a molding face of a lower mold onto which a liquid raw material of flexible foam made of a synthetic resin is poured. In the step of forming a cavity, a cavity is formed as an upper mold is laid over the lower mold on which the three-dimensional mesh-like body is disposed a contact face of a projection projected on the upper mold toward the cavity is contacted with a back surface of the three-dimensional mesh-like body, and the three-dimensional mesh-like body is fixed in the cavity. In the step of molding, the liquid raw material is foamed in the cavity to mold a pad main body formed of the flexible foam and the three-dimensional mesh-like body is attached and fixed to a front surface of the pad main body.

Accordingly, an effect is exerted that it is possible to prevent the three-dimensional mesh-like body from being displaced with respect to the pad main body when the seat pad is being used.

Moreover, the projection is contacted with the back surface of the three-dimensional mesh-like body, so that effects are exerted that it is possible to prevent the position of the three-dimensional mesh-like body from being displaced in the process of foaming the liquid raw material and it is possible to form a vent hole on the pad main body because of the projection.

In accordance with a method of manufacture of a seat pad according to a second aspect of the invention, the back surface of the three-dimensional mesh-like body is set greater than the contact face of the projection contacting the back surface of the three-dimensional mesh-like body, so that the liquid raw material in the midway point of being foamed contacts the portions around the contact face of the projection on the back surface of the three-dimensional mesh-like body. As a result, the liquid raw material is hardened between the fibers on the back surface of the three-dimensional mesh-like body, so that it is possible to attach the back surface of the three-dimensional mesh-like body to the pad main body. The three-dimensional mesh-like body is disposed between the front surface of the three-dimensional mesh-like body and the back surface of the cured three-dimensional mesh-like body, so that in addition to the effect according to the first aspect of the invention, an effect is exerted that a person who takes a seat on the front surface of the three-dimensional mesh-like body hardly experiences an uncomfortable feeling because of the back surface of the cured three-dimensional mesh-like body.

In accordance with a method of manufacture of a seat pad according to a third and fourth aspects of the invention, in the lower mold, a tubular partitioning wall is erected on the molding face, and the top end of the partitioning wall is opened. The three-dimensional mesh-like body is inserted into an inside of the partitioning wall and the three-dimensional mesh-like body is disposed on the molding face in the step of disposing the mesh-like body, so that it is possible to prevent such an event the liquid raw material of flexible foam poured into the lower mold contacts the three-dimensional mesh-like body because of the partitioning wall. Although the boundary of the three-dimensional mesh-like body becomes harder than the three-dimensional mesh-like body or the pad main body when the liquid raw material contacts the three-dimensional mesh-like body and is hardened, the liquid raw material is prevented from contacting the side face of the three-dimensional mesh-like body located on the front surface side of the pad main body, so that it is possible to prevent such an event that a hard portion, which the liquid raw material is hardened, is formed on the front surface of the pad main body. As a result, in addition to the effect according to the first and second aspects of the invention, respectively, effects are exerted that it is possible that the touch of the front surface of the pad main body is improved and the person who takes a seat hardly experiences an uncomfortable feeling.

In accordance with a method of manufacture of a seat pad according to a fifth aspect of the invention, the partitioning wall has a height from the molding face to a top end of the partitioning wall set smaller than a height from a front surface to the back surface of the three-dimensional mesh-like body inserted into the inside of the partitioning wall. Thus, it is possible to contact the liquid raw material in the midway point of being foamed with the side face of the three-dimensional mesh-like body from the back surface of the three-dimensional mesh-like body to the top end of the partitioning wall. The liquid raw material is contacted with the side face on the back surface side of the three-dimensional mesh-like body and hardened, and the side face on the back surface side of the three-dimensional mesh-like body is attached to the pad main body. Therefore, in addition to the effect according to the fourth aspect of the invention, an effect is exerted that it is possible that the three-dimensional mesh-like body is not easily displaced in the thickness direction with respect to the pad main body when the pad main body and the three-dimensional mesh-like body pressed in the thickness direction of the seat pad are restored.

In accordance with a method of manufacture of a seat pad according to a sixth, seventh and eight aspects of the invention, the partitioning wall includes a notch portion notched from the top end toward the molding face along a height direction, so that it is possible to contact the liquid raw material in the midway point of being foamed with the side face of the three-dimensional mesh-like body on which the notch portion is located. The liquid raw material is contacted with the side face of the three-dimensional mesh-like body and hardened, and the side face of the three-dimensional mesh-like body is attached to the pad main body. Therefore, in addition to the effect according to the third, fourth and fifth aspects of the invention, respectively, an effect is exerted that it is possible that the area of the side face of the three-dimensional mesh-like body attached to the pad main body is appropriately set by appropriately setting the size or the number of the notch portion, for example.

BRIEF DESCRIPTION OF DRAWINGS

FIG. 1b is a diagram of the back surface of the seat pad.

FIGS. 2a-2b FIG. 2a is a cross sectional diagram of the end face of the seat pad taken along line IIa-IIa in FIG. 1, and FIG. 2b is a cross sectional diagram of the end face of the seat pad taken along line IIb-IIb in FIG. 1.

FIGS. 3a-3b FIG. 3a is a cross sectional diagram of the end face of a shaping mold in which a three-dimensional mesh-like body is disposed on a lower mold, and FIG. 3b is a cross sectional diagram of the end face of the shaping mold in the process of foam molding.

FIG. 5b is a diagram of the back surface of the seat pad.

FIG. 6 It is a cross sectional diagram of the end face of the seat pad taken along line VI-VI in FIG. 5a.

FIGS. 7a-7b FIG. 7a is a cross sectional diagram of the end face of a shaping mold in which a three-dimensional mesh-like body is disposed on a lower mold, and FIG. 7b is a cross sectional diagram of the end face of the shaping mold in the process of foam molding.

FIGS. 8a-8f FIG. 8a is a perspective view of the three-dimensional mesh-like body after foam-molding, FIG. 8b is a perspective view of a partitioning wall, FIG. 8c is a perspective view of a three-dimensional mesh-like body after foam-molding a seat pad according to a third embodiment, FIG. 8d is a perspective view of a partitioning wall, FIG. 8e is a perspective view of a three-dimensional mesh-like body after foam-molding a seat pad according to a fourth embodiment, and FIG. 8f is a perspective view of a partitioning wall.

FIG. 9b is a perspective view of a partitioning wall, FIG. 9c is a perspective view of a three-dimensional mesh-like body after foam-molding a seat pad according to a sixth embodiment, and FIG. 9d is a perspective view of the partitioning wall.

FIGS. 10a-10b FIG. 10a is a cross sectional diagram of the end face of a shaping mold that forms a seat pad according to a seventh embodiment in the process of foam molding, and FIG. 10b is a cross sectional diagram of the end face of the seat pad.

DESCRIPTION OF EMBODIMENTS

Figure 1B:
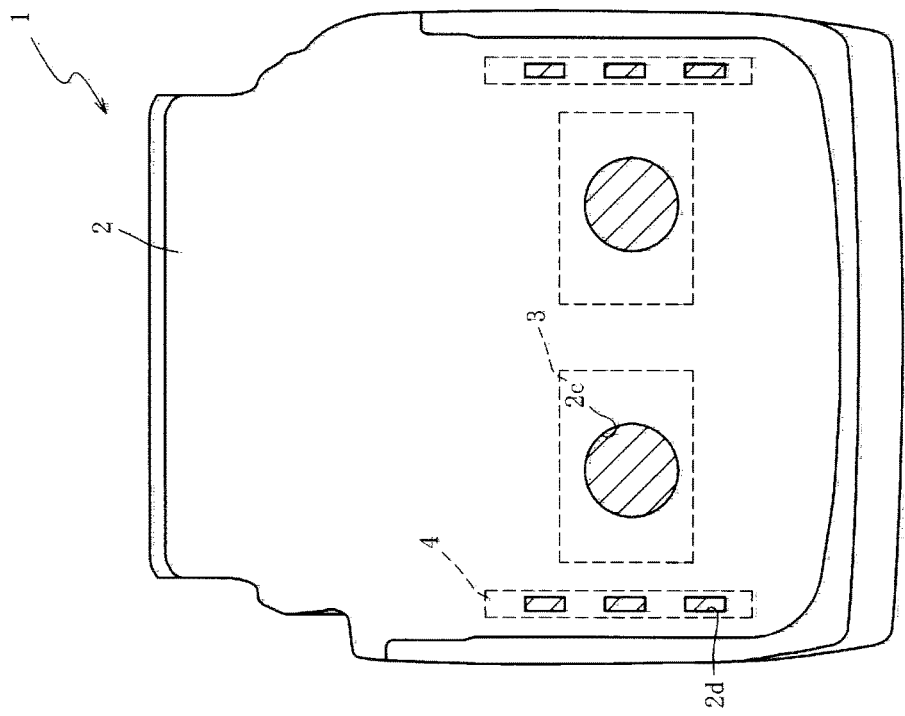
FIGS. 1a-1b FIG. 1a is a plan view of a seat pad according to a first embodiment.
Figure 1A:
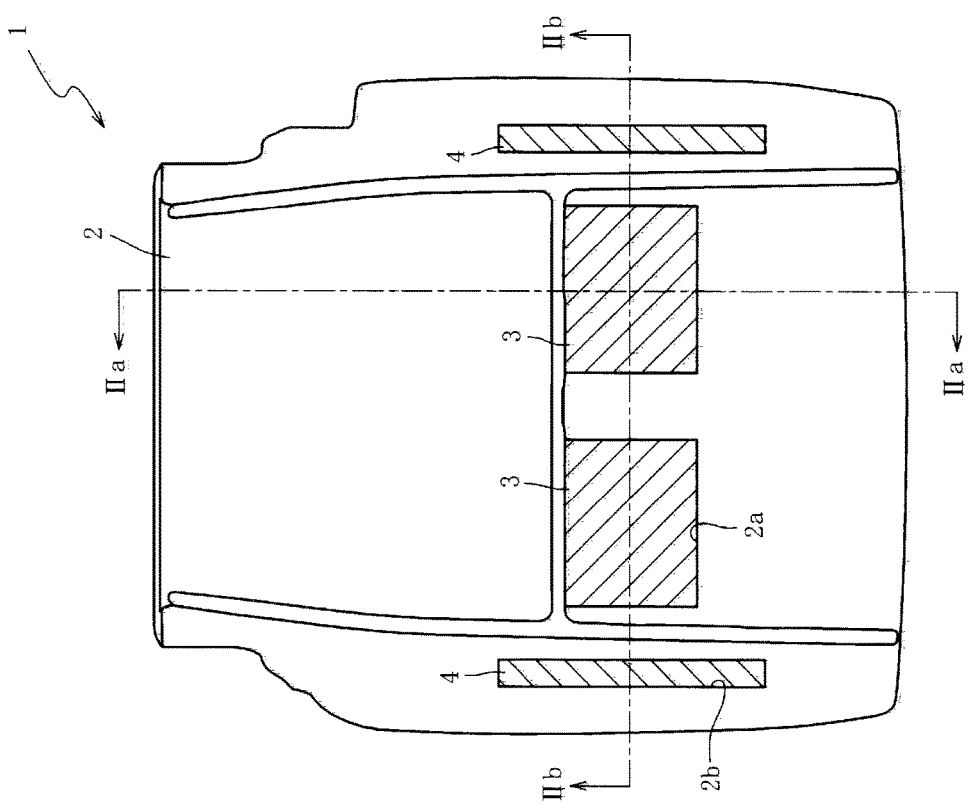

Hereinafter, preferred embodiments of the present invention will be described with reference to the drawings. First, a seat pad 1 according to a first embodiment of the present invention will be described with reference to FIG. 1. FIG. 1a is a plan view of the seat pad 1 according to the first embodiment 1, and FIG. 1b is a diagram of the back surface of the seat pad 1. It is noted that in the embodiment, the seat pad 1 used for the seating portion of the front seat of an automobile will be described.

As illustrated in FIG. 1a, the seat pad 1 includes a pad main body 2 formed of flexible foam made of a foamed, cured synthetic resin, recesses 2a and 2b in a rectangular parallelepiped shape provided on the front surface of the pad main body 2, and three-dimensional mesh-like bodies 3 and 4 in a rectangular parallelepiped shape integrally set inside the recesses 2a and 2b. As illustrated in FIG. 1b, in the seat pad 1, a vent hole 2c in a circular shape and a vent hole 2d in a rectangular shape in the back surface view are opened on the back surface of the pad main body 2, and a wire having a function of hanging a skin material (not illustrated) is built in the pad main body 2. In the seat pad 1, a backing cloth (not illustrated) such as nonwoven fabric is integrally stacked on the back surface of the pad main body 2 for preventing the pad main body 2 from being damaged or preventing an unusual sound, the front surface is covered with a cover material for a seat cover, and the seat pad is assembled on a mounting steel material (not illustrated) such as a frame.

The pad main body 2 is a member that forms the outer shape of the seat and exerts the cushioning property or the vibration absorbing property of the seat, and it is formed of flexible urethane foam in the embodiment. However, the material of the flexible foam is not limited to polyurethane, and it is of course possible to form flexible foam by foaming polyolefin such as polyethylene and polypropylene, polystyrene, polyvinyl chloride, or the like.

The recesses 2a and 2b are portions inside which the three-dimensional mesh-like bodies 3 and 4 are set, and the recesses 2a and 2b are provided on the front surface of the pad main body 2, with which the vent holes 2c and 2d communicate. The vent holes 2c and 2d are located on the back surface side of the three-dimensional mesh-like bodies 3 and 4. The three-dimensional mesh-like body 3 is disposed between the buttocks of a person who takes a seat to the knees, and the three-dimensional mesh-like body 4 is disposed on the right and left outer sides of the three-dimensional mesh-like body 3.

The three-dimensional mesh-like bodies 3 and 4 are a three-dimensional mesh-like structure formed of a plurality of three-dimensionally entangled fibers. The three-dimensional mesh-like bodies 3 and 4 are formed of a thermoplastic elastomer such as thermoplastic polyester elastomer and thermoplastic polyurethane elastomer, and fibers such as cotton, wool, rayon, nylon, and polyester, and include air permeability and elasticity. For methods for entangling fibers, the following method is adopted: a method for fulling fibers by adding any one kind or more of steam, heat, and pressure; a method for mechanically entangling fibers like a needle punch, for example; a method for attaching fibers to each other by pressing using various binders; a method for attaching fibers to each other by thermally pressing and fusing fibers themselves; and so on. The three-dimensional mesh-like bodies 3 and 4 include a felt sheet, BREATHAIR (registered trademark), or the like.

Next, the cross sectional structure of the seat pad 1 will be described with reference to FIG. 2. FIG. 2a is a cross sectional diagram of the end face of the seat pad 1 taken along line IIa-IIa in FIG. 1, and FIG. 2b is a cross sectional diagram of the end face of the seat pad 1 taken along line IIb-IIb in FIG. 1.

As illustrated in FIGS. 2a and 2b, the three-dimensional mesh-like body 3 is set inside the recess 2a provided on the front surface of the pad main body 2, one end of the vent hole 2c is opened on the bottom face of the recess 2a, and the other end is opened on the back surface of the pad main body 2. Moreover, as illustrated in FIG. 2b, the three-dimensional mesh-like body 4 is set inside the recess 2b provided on the front surface of the pad main body 2, one end of the vent hole 2d is opened on the bottom face of the recess 2b, and the other end is opened on the back surface of the pad main body 2. The air permeability of the pad main body 2 in the thickness direction can be secured using the three-dimensional mesh-like bodies 3 and 4 and the vent holes 2c and 2d, so that a sweaty feeling experienced by the person who takes a seat can be suppressed.

Furthermore, the thicknesses of the three-dimensional mesh-like bodies 3 and 4 are set to about a half of the thickness of the pad main body 2, and the vent holes 2c and 2d are formed on the back surface side of the three-dimensional mesh-like bodies 3 and 4. The mass of the pad main body 2 can be reduced by the vent holes 2c and 2d, and the densities of the three-dimensional mesh-like bodies 3 and 4 are set smaller than the density of the pad main body 2, so that the weight of the seat pad 1 can be reduced.

The back surfaces of the three-dimensional mesh-like bodies 3 and 4 are attached to the bottom faces of the recesses 2a and 2b (the pad main body 2) through hardened back surface layers 5 and 7, and the side faces are attached to the inner side faces of the recesses 2a and 2b (the pad main body 2) through hardened side face layers 6 and 8. The hardened back surface layers 5 and 7 and the hardened side face layers 6 and 8 are layers that the liquid raw material of the pad main body 2 is hardened between fibers forming the three-dimensional mesh-like bodies 3 and 4. The back surfaces of the three-dimensional mesh-like bodies 3 and 4 are attached to the bottom faces of the recesses 2a and 2b through the hardened back surface layers 5 and 7, so that it is possible that the three-dimensional mesh-like bodies 3 and 4 are not easily displaced with respect to the pad main body 2 even though the seat pad 1 receives lateral vibrations and longitudinal vibrations (loads) of the seat. Thus, comfortableness to sit can be improved.

Moreover, the side faces of the three-dimensional mesh-like bodies 3 and 4 are attached to the inner side faces of the recesses 2a and 2b through the hardened side face layers 6 and 8, so that it is possible that the three-dimensional mesh-like bodies 3 and 4 are not easily displaced in the thickness direction with respect to the pad main body 2 when the pad main body 2 and the three-dimensional mesh-like bodies 3 and 4 pressed in the thickness direction of the seat pad 1 are restored.

Figure 4:
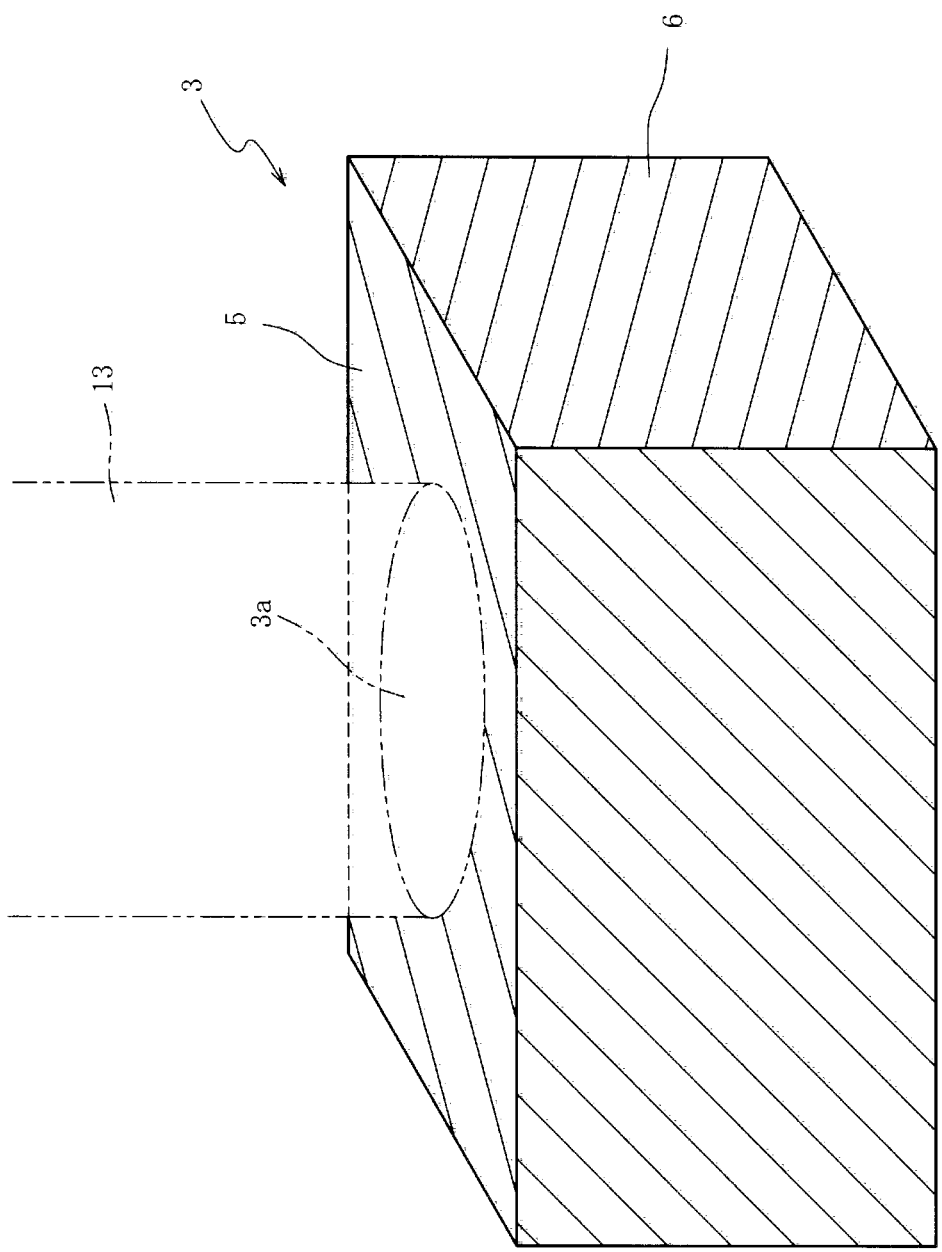
FIG. 4 It is a perspective view of the three-dimensional mesh-like body in the process of foam molding.

Next, a method of manufacture of the seat pad 1 will be described with reference to FIGS. 3 and 4. FIG. 3a is a cross sectional diagram of the end face of a shaping mold 10 in which the three-dimensional mesh-like body 3 is disposed on a lower mold 11, FIG. 3b is a cross sectional diagram of the end face of the shaping mold 10 in the process of foam molding (curing), and FIG. 4 is a perspective view of the three-dimensional mesh-like body 3 in the process of foam molding (curing). It is noted that in FIGS. 3a and 3b, a wire built in the pad main body 2, nonwoven fabric integrally stacked on the back surface of the pad main body 2, or the like is omitted in the drawings.

As illustrated in FIG. 3a, the three-dimensional mesh-like bodies 3 and 4 are disposed on a molding face 11a of the lower mold 11, on which the front surface (the seating face) of the pad main body 2 is formed, as the front surfaces are in intimate contact. It is noted that on the molding face 11a of the lower mold 11, marks are provided at the positions at which the three-dimensional mesh-like bodies 3 and 4 are disposed, and retainers (not illustrated) such as pins are projected. The three-dimensional mesh-like bodies 3 and 4 can be disposed as aligned with the marks, and the three-dimensional mesh-like bodies 3 and 4 can be attached or temporarily attached to the molding face 11a using the retainers.

As illustrated in FIG. 3b, cylindrical projections 13 and 14 are projected on an upper mold 12 of the shaping mold 10 toward a cavity C. The projection 13 is provided on the back surface side of the three-dimensional mesh-like body 3, and the projection 14 is provided on the back surface side of the three-dimensional mesh-like body 4. The projection 13 is set to have the length in which the tip end (the contact face) can contact the back surface of the three-dimensional mesh-like body 3 when the upper mold 12 is closed to hermetically seal the cavity C. Moreover, the projection 14 is set to have the length in which the tip end (the contact face) can contact the back surface of the three-dimensional mesh-like body 4 when the upper mold 12 is closed to hermetically seal the cavity C. It is noted that the back surfaces of the three-dimensional mesh-like bodies 3 and 4 are set greater than the tip ends (the contact faces) of the projections 13 and 14.

In order to foam-mold the seat pad 1 using the shaping mold 10, as illustrated in FIG. 3a, first, the three-dimensional mesh-like bodies 3 and 4 are disposed on the molding face 11a of the lower mold 11. Subsequently, an injector (not illustrated) is used to inject a flexible foam liquid raw material into the lower mold 11, the upper mold 12 is closed to hermetically seal the cavity C, and the liquid raw material is filled in the cavity C while being foamed. In this manner, the liquid raw material is foamed and filled in the cavity C, and as illustrated in FIG. 3b, the pad main body 2 made of flexible foam is foamed and formed.

The liquid raw material injected into the lower mold 11 and the liquid raw material in the midway point of being foamed are penetrated between the fibers of the three-dimensional mesh-like bodies 3 and 4, and hardened between the fibers of the three-dimensional mesh-like bodies 3 and 4 by heating the shaping mold 10. On the back surfaces of the three-dimensional mesh-like bodies 3 and 4, since the liquid raw material is not enabled to contact the portions with which the projections 13 and 14 are contacted, the hardened back surface layers 5 and 7 are formed on the back surfaces of the three-dimensional mesh-like bodies 3 and 4 other than the portions, and the hardened side face layers 6 and 8 are formed on the side faces of the three-dimensional mesh-like bodies 3 and 4. Thus, the three-dimensional mesh-like bodies 3 and 4 are integrally formed with the pad main body 2. After molding, the upper mold 12 is opened and removed, and the seat pad 1 is obtained, which is formed with the vent holes 2c and 2d (see FIGS. 2a and 2b) using the projections 13 and 14.

When the seat pad 1 is manufactured as described above, the back surfaces of the three-dimensional mesh-like bodies 3 and 4 are contacted with the projections 13 and 14, so that it is possible to prevent the positions of the three-dimensional mesh-like bodies 3 and 4 from being displaced in the process of foaming the liquid raw material. Moreover, since the vent holes 2c and 2d can be formed on the pad main body 2 using the projections 13 and 14, the workability of forming the pad main body 2 is excellent.

Furthermore, since the back surfaces of the three-dimensional mesh-like bodies 3 and 4 are set greater than the contact faces of the projections 13 and 14, the liquid raw material in the midway point of being foamed contacts the portions around the contact faces of the projections 13 and 14 on the back surfaces of the three-dimensional mesh-like bodies 3 and 4. As a result, the liquid raw material is hardened between the fibers on the back surfaces of the three-dimensional mesh-like bodies 3 and 4, and the hardened back surface layers 5 and 7 are formed on the back surfaces of the three-dimensional mesh-like bodies 3 and 4, so that the back surfaces of the three-dimensional mesh-like bodies 3 and 4 can be attached to the pad main body 2. The back surfaces of the three-dimensional mesh-like bodies 3 and 4 are attached to the pad main body 2, so that it is possible that the three-dimensional mesh-like bodies 3 and 4 are not easily displaced with respect to the pad main body 2 even though the seat pad 1 receives vibrations (loads).

In addition, the side faces of the three-dimensional mesh-like bodies 3 and 4 are attached to the inner side faces of the recesses 2a and 2b through the hardened side face layers 6 and 8 that the liquid raw material of flexible foam is hardened between the fibers on the side faces of the three-dimensional mesh-like bodies 3 and 4. Therefore, it is possible that the three-dimensional mesh-like bodies 3 and 4 are not easily displaced in the thickness direction with respect to the pad main body 2 when the pad main body 2 and the three-dimensional mesh-like bodies 3 and 4 pressed in the thickness direction of the seat pad 1 are restored. Thus, it is possible that the person who takes a seat hardly experiences an uncomfortable feeling.

As illustrated in FIG. 4, the back surface of the three-dimensional mesh-like body 3 is contacted with the projection 13, and the liquid raw material can be prevented from contacting the portion of the back surface of the three-dimensional mesh-like body 3 with which the projection 13 is contacted. Therefore, the portion with which the projection 13 is contacted can be made a ventilation portion 3a on which the hardened layer is not formed. On that account, it is possible to prevent a reduction in the air permeability of the three-dimensional mesh-like body 3 because the ventilation portion 3a that communicates with the vent hole 2c (see FIG. 2b) is blocked with the hardened layer. The three-dimensional mesh-like body 4 is similarly contacted with the projection 14, so that it is possible to prevent a reduction in the air permeability of the three-dimensional mesh-like body 4.

Figure 5B:
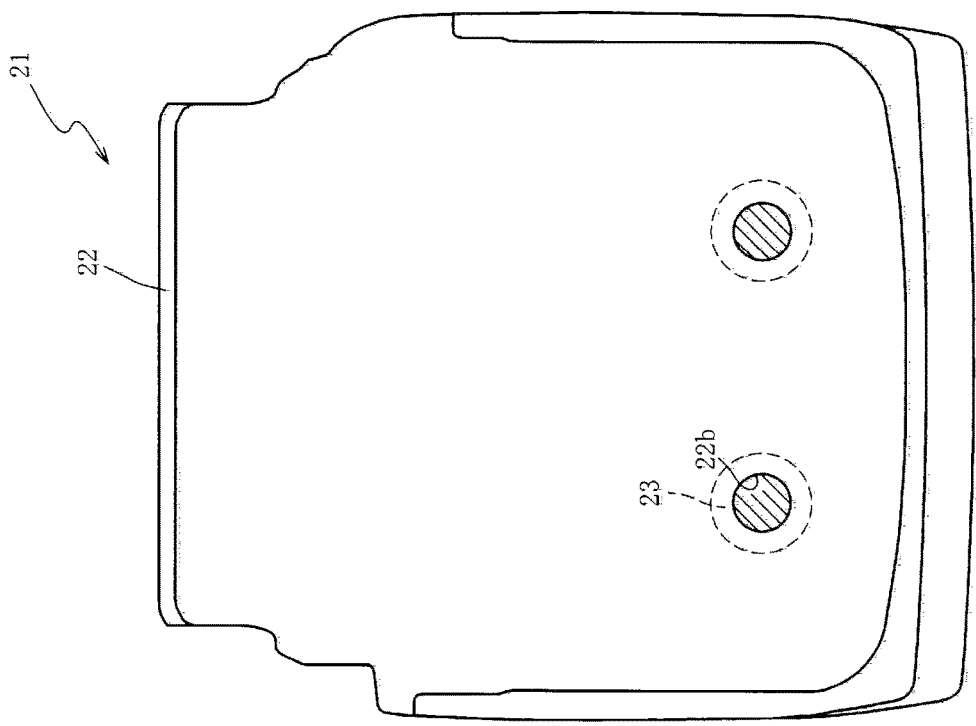
FIGS. 5a-5b FIG. 5a is a plan view of a seat pad according to a second embodiment.
Figure 5A:
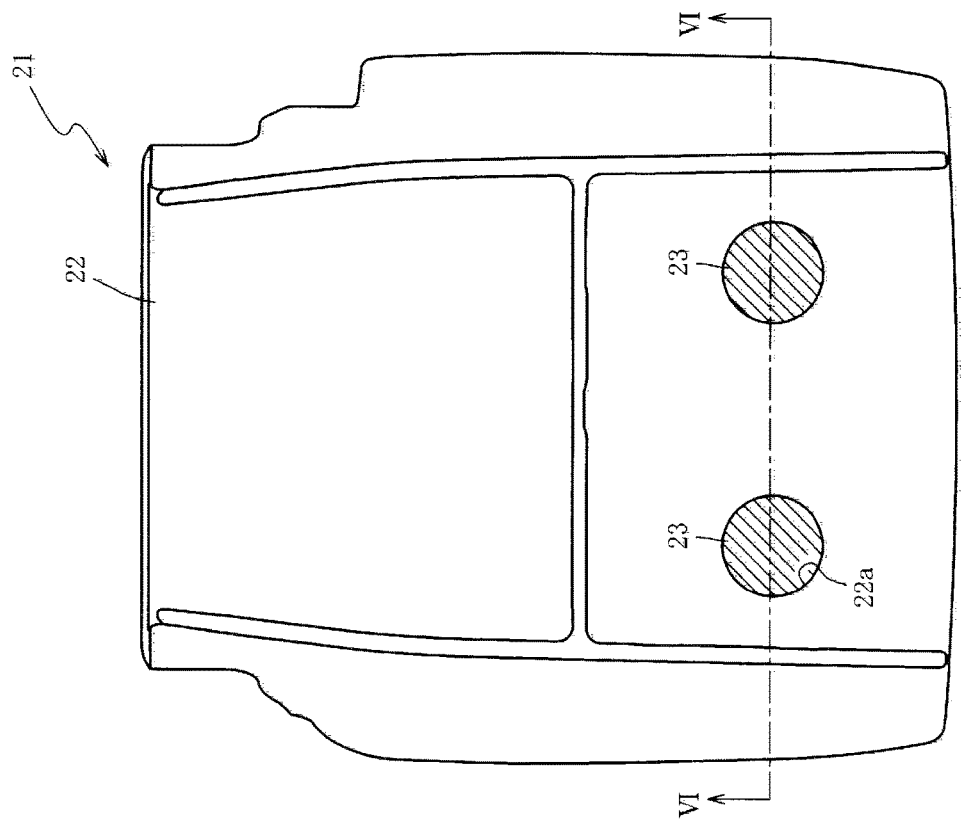
Figure 6:
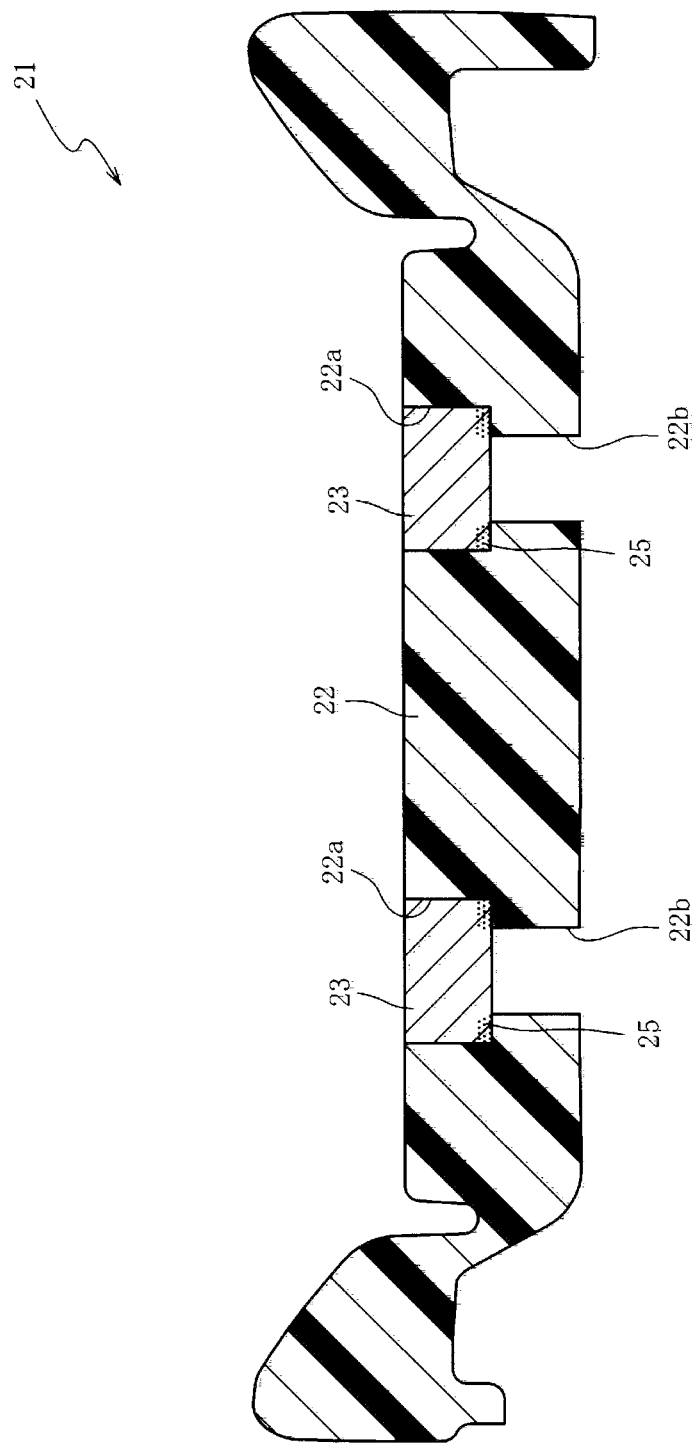

Next, a second embodiment will be described with reference to FIGS. 5 to 7. In the first embodiment, the case is described where the hardened side face layers 6 and 8 are formed on the side faces of the three-dimensional mesh-like bodies 3 and 4. On the other hand, in the second embodiment, the case will be described where a hardened layer is not formed on the side face of a three-dimensional mesh-like body 23. It is noted that portions the same as the portions described in the first embodiment are designated the same reference numerals and signs, and the following description is omitted. First, a seat pad 21 according to the second embodiment will be described with reference to FIG. 5. FIG. 5a is a plan view of the seat pad 21 according to the second embodiment, and FIG. 5b is a diagram of the back surface of the seat pad 21. It is noted that also in the second embodiment, the seat pad 21 used for the seating portion of the front seat of an automobile will be described.

As illustrated in FIG. 5a, the seat pad 21 includes a pad main body 22 formed of flexible foam made of a foamed synthetic resin, a recess 22a provided on the front surface of the pad main body 22 in a cylindrical outer shape, and the cylindrical three-dimensional mesh-like body 23 integrally set inside the recess 22a. The three-dimensional mesh-like body 23 is disposed near the underside of the thigh of a person who takes a seat, and in the seat pad 21, a cylindrical vent hole 22b is opened on the back surface of the pad main body 22 as illustrated in FIG. 5b.

Next, the cross sectional structure of the seat pad 21 will be described with reference to FIG. 6. FIG. 6 is a cross sectional diagram of the end face of the seat pad 21 taken along line VI-VI in FIG. 5a. As illustrated in FIG. 6, the three-dimensional mesh-like body 23 is set inside the recess 22a provided on the front surface of the pad main body 22, and one end of the vent hole 22b in a circular shape in the cross section is opened on the bottom face of the recess 22b, and the other end is opened on the back surface of the pad main body 22. The air permeability of the pad main body 22 in the thickness direction can be secured using the three-dimensional mesh-like body 23 and the vent hole 22b, so that a sweaty feeling experienced by the person who takes a seat can be suppressed.

The back surface of the three-dimensional mesh-like body 23 is attached to the bottom face of the recess 22a (the pad main body 22) through a hardened back surface layer 25, and the side face is held on the recess 22a because of the elasticity of the pad main body 22. The hardened back surface layer 25 is a layer that the liquid raw material of the pad main body 22 is hardened between fibers forming the three-dimensional mesh-like body 23. The back surface of the three-dimensional mesh-like body 23 is attached to the bottom face of the recess 22a through the hardened back surface layer 25, so that it is possible that the three-dimensional mesh-like body 23 is not easily displaced with respect to the pad main body 22 even though the seat pad 21 receives vibrations (loads).

Moreover, the side face of the three-dimensional mesh-like body 23 is held on the recess 22a because of the elasticity of the pad main body 22, not using the hardened side face layer described in the first embodiment through which the side face of the three-dimensional mesh-like body 23 is attached to the pad main body 22. The hardened side face layer is not provided, so that it is possible that the hardened layer is not exposed on the front surface of the pad main body 22. When the liquid raw material of flexible foam is hardened between the fibers of the three-dimensional mesh-like body 23, the boundary (the hardened layer) of the hardened three-dimensional mesh-like body 23 is cured. However, the hardened layer is not provided on the side face of the three-dimensional mesh-like body 23, so that it is possible that the person who takes a seat hardly experiences a stiff touch or an uncomfortable feeling.

Next, a method of manufacture of the seat pad 21 will be described with reference to FIGS. 7, 8a, and 8b. FIG. 7a is a cross sectional diagram of the end face of a shaping mold 30 in which the three-dimensional mesh-like body 23 is disposed on a lower mold 11, and FIG. 7b is a cross sectional diagram of the end face of the shaping mold 30 in the process of foam molding (curing). Moreover, FIG. 8a is a perspective view of the three-dimensional mesh-like body 23 after foam-molding, and FIG. 8b is a perspective view of a partitioning wall 31. It is noted that in FIGS. 7a and 7b, a wire built in the pad main body 22, nonwoven fabric integrally stacked on the back surface of the pad main body 22, or the like is omitted in the drawings. Moreover, in FIG. 8, the pad main body integrally formed with the three-dimensional mesh-like body is omitted in the drawings (the same thing is applied in FIG. 9).

As illustrated in FIG. 7a, in the shaping mold 30, a partitioning wall 31 in a nearly cylindrical shape having an opened top end is erected on a molding face 11a of the lower mold 11 forming the front surface of the pad main body 22 (the seating face). The partitioning wall 31 is a portion into which the three-dimensional mesh-like body 23 is inserted, and the inner diameter is set slightly greater than the outer diameter of the three-dimensional mesh-like body 23. When the three-dimensional mesh-like body 23 is inserted into the inside of the partitioning wall 31, the partitioning wall 31 prevents the liquid raw material of flexible foam from contacting the side face of the three-dimensional mesh-like body 23. The height of the partitioning wall 31 is almost the same as the height of the three-dimensional mesh-like body 23, and is set to about a half of the thickness of the pad main body 22. The three-dimensional mesh-like body 23 is inserted into the inside of the partitioning wall 31 to dispose the three-dimensional mesh-like body 23 at a predetermined position, so that it is possible to prevent operation errors such as disposing the three-dimensional mesh-like body 23 at a wrong position and the negligence of disposing the three-dimensional mesh-like body 23.

As illustrated in FIG. 7b, a cylindrical projection 32 is projected on an upper mold 12 of the shaping mold 30 toward a cavity C. The projection 32 is provided on the back surface side of the three-dimensional mesh-like body 23. The projection 32 is set to have the length in which the tip end (the contact face) can contact the back surface of the three-dimensional mesh-like body 23 when the upper mold 12 is closed to hermetically seal the cavity C. The back surface of the three-dimensional mesh-like body 23 is set greater than the tip end (the contact face) of the projection 32.

In order to foam-mold the seat pad 21 using the shaping mold 30, as illustrated in FIG. 7a, first, the three-dimensional mesh-like body 23 erected on the molding face 11a of the lower mold 11 is inserted into the inside of the partitioning wall 31. Subsequently, an injector (not illustrated) is used to inject a flexible foam liquid raw material into the lower mold 11, the upper mold 12 is closed to hermetically seal the cavity C, and the liquid raw material is filled in the cavity C while being foamed. In this manner, the liquid raw material is foamed and filled in the cavity C, and the pad main body 22 made of flexible foam is foamed and formed as illustrated in FIG. 7b.

The liquid raw material injected into the lower mold 11 and the liquid raw material in the midway point of being foamed are prevented from contacting the side face of the three-dimensional mesh-like body 23 by the partitioning wall 31. Moreover, since the liquid raw material is not enabled to contact the portion, which the projection 32 contacts, on the back surface of the three-dimensional mesh-like body 23, the hardened back surface layer 25 is formed on the back surface of the three-dimensional mesh-like body 23 (the portions around the projection 32) other than that portion. Thus, the three-dimensional mesh-like body 23 is integrally formed with the pad main body 22. After molding, the upper mold 12 is opened and removed, and the seat pad 21 is obtained on which the vent hole 22b (see FIG. 6) is formed using the projection 32.

It is noted that in the seat pad 21, a gap is formed between the side face of the three-dimensional mesh-like body 23 and the pad main body 22 by the thickness of the partitioning wall 31 in the shaping mold 30. The gap is filled because of the elasticity of the pad main body 22 by removing the mold, and the side face of the three-dimensional mesh-like body 23 is held because of the elasticity of the pad main body 22.

As illustrated in FIGS. 8a and 8b, since the height of the partitioning wall 31 is set to almost the same as the height of the three-dimensional mesh-like body 23, when the three-dimensional mesh-like body 23 is inserted from an opening 31a on the top end of the partitioning wall 31 into the partitioning wall 31 and then a liquid raw material of flexible foam is injected into the lower mold 11, the partitioning wall 31 can prevent a side face 23b of the three-dimensional mesh-like body 23 from contacting the liquid raw material. When the liquid raw material contacts the side face 23b of the three-dimensional mesh-like body 23 and is hardened between fibers, the boundary (the hardened layer) of the hardened three-dimensional mesh-like body 23 appears on a front surface 23c of the three-dimensional mesh-like body 23. However, the partitioning wall 31 can prevent the hardened layer being formed on the side face 23b of the three-dimensional mesh-like body 23, so that it is possible to prevent the hardened layer from being exposed on the front surface 23c of the three-dimensional mesh-like body 23 and the front surface of the pad main body 22. As a result, it is possible that the person who takes a seat hardly experiences a stiff sensation or an uncomfortable feeling caused by the hardened layer exposed on the front surface of the pad main body 22.

It is noted that as illustrated in FIG. 8a, since the back surface of the three-dimensional mesh-like body 23 is contacted with the projection 32 (see FIG. 7b), the ventilation portion 23a, on which the hardened layer is not formed, is formed on the portion contacted with the projection 32, and the hardened back surface layer 25 is formed around the portion. The ventilation portion 23a is formed, so that it is possible to prevent a reduction in the air permeability of the three-dimensional mesh-like body 23 that communicates with the vent hole 22b (see FIG. 6).

Next, a third embodiment will be described with reference to FIGS. 8c and 8d. In the second embodiment, the case is described where the height of the partitioning wall 31 is set to almost the same as the height of the three-dimensional mesh-like body 23. On the other hand, in the third embodiment, the case will be described where the height of a partitioning wall 41 is set lower than the height of a three-dimensional mesh-like body 43. It is noted that since the third embodiment is the same as the second embodiment other than the partitioning wall 41 and the three-dimensional mesh-like body 43, portions the same as the portions described in the second embodiment are designated the same reference numerals and signs, and the following description is omitted. FIG. 8*c* is a perspective view of the three-dimensional mesh-like body 43 after foam-molding a seat pad according to the third embodiment, and FIG. 8*d* is a perspective view of the partitioning wall 41.

As illustrated in FIGS. 8*c* and 8*d*, the height of the partitioning wall 41 is set lower than the height of the three-dimensional mesh-like body 43. In the embodiment, in the partitioning wall 41, the height from the molding face 11*a* to the opening 41*a* is set in the range of 10 to 30 mm. When the three-dimensional mesh-like body 43 is inserted from an opening 41*a* on the top end of the partitioning wall 41 into the partitioning wall 41 and then a liquid raw material of flexible foam is injected into the lower mold 11, the partitioning wall 41 prevents the liquid raw material immediately after the injection from contacting a side face 43*b* on a front surface 43*c* side of the three-dimensional mesh-like body 43.

Although depending on the size of the shaping mold or the material of the flexible foam, the liquid raw material injected into the shaping mold is collected in a depth of 10 to 20 mm on the molding face 11*a* of the lower mold 11 immediately after the injection into the shaping mold. In a period from before foaming to the initial stage of foaming (about zero to five seconds after the injection although depending on reactivity), since the viscosity of the liquid raw material is relatively low, the liquid raw material is easily penetrated between the fibers of the three-dimensional mesh-like body 43. Therefore, the height from the molding face 11*a* to the opening 41*a* of the partitioning wall 41 is set to the range of 10 to 30 mm in order that the liquid raw material immediately after the injection is not entered into the partitioning wall 41 beyond the partitioning wall 41. Thus, the position of the opening 41*a* of the partitioning wall 41 is set above the liquid level of the liquid raw material collected on the molding face 11*a*. As a result, it is possible to prevent such an event that the liquid raw material immediately after the injection and before foamed is penetrated into the three-dimensional mesh-like body 43.

It is noted that the liquid raw material in the midway point of being foamed contacts the side face of the three-dimensional mesh-like body 43 projecting from the opening 41*a*, and a hardened side face layer 46 is formed on the back surface side. Moreover, the liquid raw material in the midway point of being foamed contacts the back surface of the three-dimensional mesh-like body 43 (except a ventilation portion 43*a* with which a projection 32 is contacted), and a hardened back surface layer 45 is formed.

The hardened side face layer 46 is formed on the three-dimensional mesh-like body 43, so that it is possible that the back surface side of the three-dimensional mesh-like body 43 is not enabled to be relatively displaced in the thickness direction with respect to the pad main body 22 because of the hardened side face layer 46. As a result, it is possible that the three-dimensional mesh-like body 43 is not easily displaced in the thickness direction with respect to the pad main body 22 when the pad main body 22 and the three-dimensional mesh-like body 43 pressed in the thickness direction are restored. Furthermore, as illustrated in FIG. 8*c*, in the hardened side face layer 46, an edge 46*a* on the front surface 43*c* side of the three-dimensional mesh-like body 43 is provided apart from the front surface 43*c* of the three-dimensional mesh-like body 43 by the height of the partitioning wall 41, so that it is possible to provide a gap between the front surface 43*c* of the three-dimensional mesh-like body 43 and the hardened side face layer 46. As a result, it is possible that the person who takes a seat hardly experiences a stiff sensation or an uncomfortable feeling caused by the hardened side face layer 46.

Next, a fourth embodiment will be described with reference to FIGS. 8*e* and 8*f*. In the second embodiment, the case is described where the partitioning wall 31 blocks the contact of the side face 23*b* of the three-dimensional mesh-like body 21 with the liquid raw material of flexible foam. On the other hand, in the fourth embodiment, the case will be described where a partitioning wall 51 selectively allows the contact of a side face 53*b* of a three-dimensional mesh-like body 53 with the liquid raw material of flexible foam. It is noted that since the fourth embodiment is the same as the second embodiment other than the partitioning wall 51 and the three-dimensional mesh-like body 53, portions the same as the portions described in the second embodiment are designated the same reference numerals and signs, and the following description is omitted. FIG. 8*e* is a perspective view of the three-dimensional mesh-like body 53 after foam-molding a seat pad according to the fourth embodiment, and FIG. 8*f* is a perspective view of the partitioning wall 51.

As illustrated in FIGS. 8*e* and 8*f*, the height of the partitioning wall 51 is set to almost the same as the height of the three-dimensional mesh-like body 53, and a slit-shaped notch portion 51*b* is formed, which is cut from an opening 51*a* on the top end to a molding face 11*a* (see FIG. 7*a*) along the height direction. The notch portion 51*b* is provided at three places in the circumferential direction of the partitioning wall 51 as spaced from one another, and the area of the notch portion 51*b* is set smaller than the area of the side face of the partitioning wall 51. Moreover, the notch portion 51*b* is set in almost the same width from a top end 51*a* of the partitioning wall 51 to the molding face 11*a* (see FIG. 7*a*).

In order to foam-mold the seat pad, first, the three-dimensional mesh-like body 53 is inserted from the opening 51*a* on the top end of the partitioning wall 51 into the partitioning wall 51, and then a liquid raw material of flexible foam is injected into the lower mold 11. By doing so, in the notch portion 51*b*, the liquid raw material contacts the side face 53*b* of the three-dimensional mesh-like body 53. As a result, a hardened side face layer 56 is formed on the side face 53*b* of the three-dimensional mesh-like body 53 exposed from the notch portion 51*b*, and a hardened back surface layer 55 is formed on the back surface of the three-dimensional mesh-like body 53 exposed from the opening 51*a* (except a ventilation portion 53*a* with which a projection 32 is contacted).

In the three-dimensional mesh-like body 53, the hardened side face layer 56 is formed in the height direction of the side face 53*b*, so that it is possible that the three-dimensional mesh-like body 53 is not enabled to be relatively displaced in the thickness direction with respect to the pad main body 22. As a result, it is possible that the three-dimensional mesh-like body 53 is not easily displaced in the thickness direction with respect to the pad main body 22 when the pad main body 22 and the three-dimensional mesh-like body 53 pressed in the thickness direction are restored.

Furthermore, an entered portion 56*a* is formed on the hardened side face layer 56 because of the notch portion 51*b* formed on the partitioning wall 51, and a part of the edge on the front surface 53c side of the three-dimensional mesh-like body 53 is entered into the back surface side of the three-dimensional mesh-like body 53. Therefore, it is possible to reduce the area of the hardened side face layer 56 in the circumferential direction of the side face 53b, as compared with the case where the hardened side face layer is formed entirely around the side face 53b. As a result, it is possible that the person who takes a seat hardly experiences a stiff sensation or an uncomfortable feeling caused by the hardened side face layer 56, as compared with the case where the hardened side face layer is formed entirely around the side face 53b of the three-dimensional mesh-like body 53.

Figure 9A:
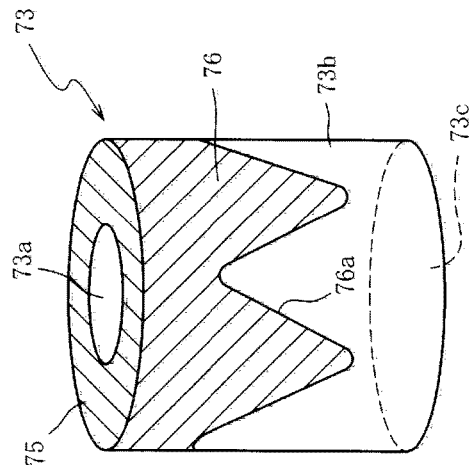
FIGS. 9a-9d FIG. 9a is a perspective view of a three-dimensional mesh-like body after foam-molding a seat pad according to a fifth embodiment.

Next, a fifth embodiment will be described with reference to FIGS. 9a and 9b. In the second embodiment, the case is described where the partitioning wall 31 blocks the contact of the side face 23b of the three-dimensional mesh-like body 21 with the liquid raw material of flexible foam. On the other hand, in the fifth embodiment, the case will be described where a partitioning wall 61 selectively allows the contact of a side face 63b of a three-dimensional mesh-like body 63 with the liquid raw material of flexible foam. It is noted that since the fifth embodiment is the same as the second embodiment other than the partitioning wall 61 and the three-dimensional mesh-like body 63, portions the same as the portions described in the second embodiment are designated the same reference numerals and signs, and the following description is omitted. FIG. 9a is a perspective view of the three-dimensional mesh-like body 63 after foam-molding a seat pad according to the fifth embodiment, and FIG. 9b is a perspective view of the partitioning wall 61.

Figure 9B:
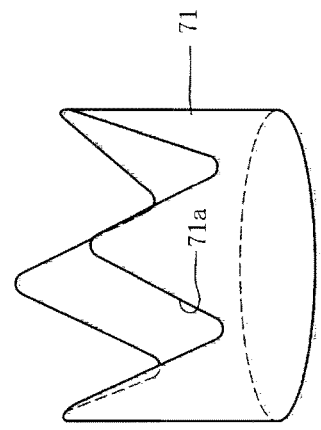

As illustrated in FIGS. 9a and 9b, the height of the partitioning wall 61 is set to almost the same as the height of the three-dimensional mesh-like body 63, and a slit-shaped notch portion 61b is notched and formed in a predetermined depth from an opening 61a on the top end to a portion not reaching a molding face 11a (see FIG. 7a) along the height direction. The notch portion 61b is provided at three places in the circumferential direction of the partitioning wall 61 as spaced from one another, and the area of the notch portion 61b is set smaller than the area of the side face of the partitioning wall 61. Moreover, the lower end of the notch portion 61b is formed in an arc shape, and the lower end is located 10 to 30 mm apart from the molding face 11a (see FIG. 7a).

In order to foam-mold the seat pad, first, the three-dimensional mesh-like body 63 is inserted from the opening 61a on the top end of the partitioning wall 61 into the partitioning wall 61, and then a liquid raw material of flexible foam is injected into the lower mold 11. By doing so, in the notch portion 61b, the liquid raw material contacts the side face 63b of the three-dimensional mesh-like body 63. As a result, a hardened side face layer 66 is formed on the side face 63b of the three-dimensional mesh-like body 63 exposed from the notch portion 61b, and a hardened back surface layer 65 is formed on the back surface of the three-dimensional mesh-like body 63 exposed from the opening 61a (except a ventilation portion 63a with which the projection 32 is contacted). Since the lower end of the notch portion 61b is located 10 to 30 mm apart from the molding face 11a (see FIG. 7a), the edge of the hardened side face layer 66 is located at a place 10 to 30 mm entered from a front surface 63c of the three-dimensional mesh-like body 63 to the back surface side.

The hardened side face layer 56 is formed on the side face 63b of the three-dimensional mesh-like body 63, so that it is possible that the three-dimensional mesh-like body 63 is not easily displaced relatively in the thickness direction with respect to the pad main body 22. As a result, it is possible that the three-dimensional mesh-like body 63 is not easily displaced in the thickness direction with respect to the pad main body 22 when the pad main body 22 and the three-dimensional mesh-like body 63 are pressed in the thickness direction and then restored.

Moreover, the edge of the hardened side face layer 66 is located at a place 10 to 30 mm entered from the front surface 63c of the three-dimensional mesh-like body 63 to the back surface side, so that it is possible that the hardened side face layer 66 does not exist from the front surface 63c to a portion in the depth of 10 to 30 mm. Therefore, it is possible that an uncomfortable feeling (a degraded touch) does not occur near the three-dimensional mesh-like body 63 and the front surface of the pad main body 22 caused by a hard hardened side face layer 66.

Furthermore, the entered portion 66a is formed on the hardened side face layer 66 because of the notch portion 61b formed on the partitioning wall 61, and a part of the edge on the front surface 63c side of the three-dimensional mesh-like body 63 is entered into the back surface side of the three-dimensional mesh-like body 63. Therefore, it is possible to reduce the area of the hardened side face layer 66 in the circumferential direction of the side face 63b, as compared with the case where the hardened side face layer is formed entirely around the side face 63b. As a result, it is possible to reduce a stiff sensation or an uncomfortable feeling caused by the hardened side face layer 66, as compared with the case where the hardened side face layer is formed entirely around the side face 63b of the three-dimensional mesh-like body 63.

In addition, the edge of the hardened side face layer 66 located on the front surface 63c of the three-dimensional mesh-like body 63 is formed in an arc shape, so that it is possible that the person who takes a seat hardly experiences an uncomfortable feeling caused by the hardened side face layer 66 when the person who takes a seat compresses the three-dimensional mesh-like body 63 from the front surface 63c in the thickness direction, as compared with the case where the edge of the hardened side face layer 66 is angular at an acute angle.

Figure 9C:
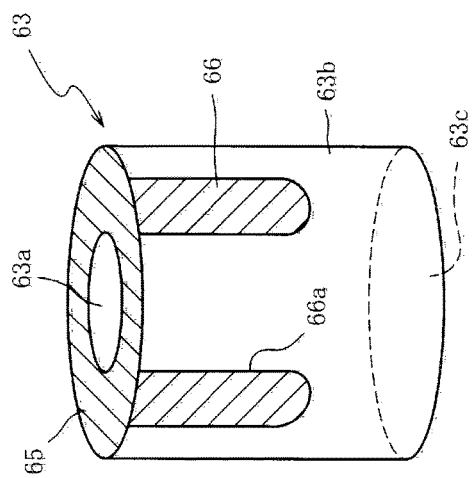

Next, a sixth embodiment will be described with reference to FIGS. 9c and 9d. In the fifth embodiment, the case is described where the height of the partitioning wall 61 on which the notch portion 61b is formed is almost the same as the height of the three-dimensional mesh-like body 63. On the other hand, in the sixth embodiment, the case will be described where a partitioning wall 71 on which a notch portion 71a is formed is set lower than the height of a three-dimensional mesh-like body 73. It is noted that since the sixth embodiment is the same as the second embodiment other than the partitioning wall 71 and the three-dimensional mesh-like body 73, portions the same as the portions described in the second embodiment are designated the same reference numerals and signs, and the following description is omitted. FIG. 9c is a perspective view of the three-dimensional mesh-like body 73 after foam-molding a seat pad according to the sixth embodiment, and FIG. 9d is a perspective view of the partitioning wall 71.

Figure 9D:
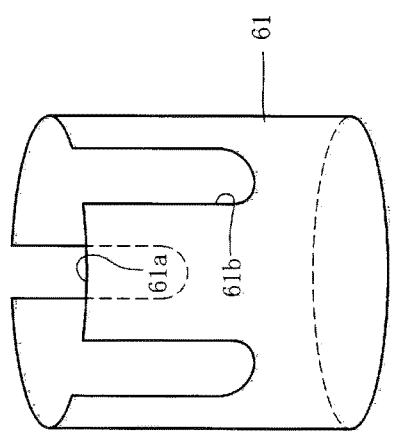

As illustrated in FIGS. 9c and 9d, the height of the partitioning wall 71 is set lower than the height of the three-dimensional mesh-like body 73, and the notch portion 71a is notched and formed in a predetermined depth from the top end to a portion not reaching a molding face 11a (see FIG. 7a), and the width is gradually narrower along the height direction. The notch portion 71a is provided at a plurality of places in the circumferential direction of the partitioning wall 71. Moreover, the lower end of the notch portion 71a formed in an arc shape is located 10 to 30 mm apart from the molding face 11a (see FIG. 7a).

In order to foam-mold the seat pad, when the three-dimensional mesh-like body 73 is inserted from the top end of the partitioning wall 71 into the partitioning wall 71, and then a liquid raw material of flexible foam is injected into the lower mold 11 to hermetically seal a cavity C, in the notch portion 71a, the liquid raw material contacts a side face 73b of the three-dimensional mesh-like body 73. As a result, a hardened side face layer 76 is formed on the side face 73b of the three-dimensional mesh-like body 73 exposed from the notch portion 71a, and a hardened back surface layer 75 is formed on the back surface of the three-dimensional mesh-like body 73 (except a ventilation portion 73a with which the projection 32 is contacted). The hardened side face layer 76 is formed on the back surface side entirely around the side face 73b of the three-dimensional mesh-like body 73, so that it is possible to increase the area of the pad main body 22 attached to the back surface side of the three-dimensional mesh-like body 73, as compared with the fifth embodiment. As a result, it is possible to improve stability with respect to applied vibrations (loads).

Moreover, an entered portion 76a is formed on the hardened side face layer 76 because of the notch portion 71a formed on the partitioning wall 71, and a part of the edge on the front surface 73c side of the three-dimensional mesh-like body 73 is entered into the back surface side of the three-dimensional mesh-like body 73. Therefore, it is possible to reduce the area of the hardened side face layer 76 in the circumferential direction of the side face 73b, as compared with the case where the hardened side face layer is formed entirely around the side face 73b. As a result, it is possible to reduce a stiff sensation or an uncomfortable feeling caused by the hardened side face layer 76, as compared with the case where the hardened side face layer is formed entirely around the side face 73b of the three-dimensional mesh-like body 73. Furthermore, the hardened side face layer 76 is formed to have the width becoming narrower toward the front surface 73c because of the entered portion 76a, so that it is possible to smoothly remove the seat pad integrally foam-molded with the three-dimensional mesh-like body 73 out of a shaping mold 30.

Next, a seventh embodiment will be described with reference to FIG. 10. In the first embodiment to the sixth embodiment, the case is described where the contact faces of the projections 13, 14, and 32 contacted with the back surfaces of the three-dimensional mesh-like bodies 3, 4, 23, 43, 53, 63, and 73 are set smaller than the back surface of the three-dimensional mesh-like body in molding. On the other hand, in the seventh embodiment, the case will be described where the contact face of a projection 91 contacted with the back surface of a three-dimensional mesh-like body 83 is set greater than the back surface of the three-dimensional mesh-like body 83. It is noted that portions the same as the first embodiment are designated the same reference numerals and signs, and the following description is omitted. FIG. 10a is a cross sectional diagram of the end face of a shaping mold 90 that forms a seat pad 81 according to the seventh embodiment in the process of foam molding (curing), and FIG. 10b is a cross sectional diagram of the end face of the seat pad 81.

As illustrated in FIG. 10a, the three-dimensional mesh-like body 83 is disposed on a lower mold 11 that forms the front surface (the seating face) of a pad main body 82 as the front surface is in intimate contact. The cylindrical projection 91 is projected into an upper mold 12 of the shaping mold 90 toward a cavity C. The projection 91 is provided on the back surface side of the three-dimensional mesh-like body 83. The projection 91 is set to have the length in which the tip end (the contact face) can contact the back surface of the three-dimensional mesh-like body 83 when the upper mold 12 is closed to hermetically seal the cavity C. The tip end (the contact face) of the projection 91 is set greater than the back surface of the three-dimensional mesh-like body 83.

In order to foam-mold the seat pad 81 using the shaping mold 90, the three-dimensional mesh-like body 83 is disposed on the lower mold 11, and then an injector (not illustrated) is used to inject a liquid raw material of flexible foam into the lower mold 11 using. When the upper mold 12 is closed to hermetically seal the cavity C, the liquid raw material fills the inside of the cavity C while being foamed, and the pad main body 82 made of the flexible foam is foamed and formed.

The liquid raw material injected into the lower mold 11 and the liquid raw material in the midway point of being foamed are penetrated between the fibers of the three-dimensional mesh-like body 83, and hardened between the fibers of the three-dimensional mesh-like body 83. Since the liquid raw material is not enabled to contact the back surface of the three-dimensional mesh-like body 83 contacted with the projection 91, the hardened side face layer 84 is formed on the side face of the three-dimensional mesh-like body 83. Thus, the three-dimensional mesh-like body 83 is attached to and integrally formed with the pad main body 82. As illustrated in FIG. 10b, the upper mold 12 is opened and removed, and the seat pad 81 is obtained in which a vent hole 82b greater than the outer shape of the three-dimensional mesh-like body 83 is formed because of the projection 91.

In accordance with the seat pad 81 according to the embodiment, the pad main body 82 located on the back surface of the three-dimensional mesh-like body 83 can be omitted because of the vent hole 82b formed on the back surface of the three-dimensional mesh-like body 83, so that it is possible to improve the flexibility of the seat pad 81 near the three-dimensional mesh-like body 83. Moreover, the pad main body 82 located on the back surface of the three-dimensional mesh-like body 83 is omitted, so that it is possible to reduce the weight of the seat pad 81.

EXAMPLES

Next, the present invention will be described more in detail according to experimental examples. It is noted that the present invention is not limited to these experimental examples.

Experimental Example 1

Four cylindrical partitioning walls (the inner diameter is 68 mm and the height is 50 mm) are disposed on the molding face of the lower mold of a metal shaping mold. The centers of the partitioning walls are fixed to the positions of four corners of a square whose length of the diagonal line is 200 mm. A cylindrical three-dimensional mesh-like body (the outer diameter of 70 mm and the height is 50 mm) made of a felt sheet is inserted into the inside of the partitioning wall. A cylindrical projection (the diameter of 15 mm and the length of about 50 mm) is projected on the upper mold toward a cavity. The upper mold is closed to hermetically seal the cavity (the thickness is about 100 mm), and the tip end of the projection is contacted with the back surface of the three-dimensional mesh-like body inserted into the inside of the partitioning wall. Moreover the upper mold is disposed with a coarse blanket cloth (nonwoven fabric having an areal fiber weight of 80 g/m$^2$) as a backing cloth in the cavity.

After the three-dimensional mesh-like body was disposed in the partitioning wall of the lower mold, a liquid raw material of polyurethane was poured onto the molding face of the lower mold, and the upper mold was closed. The liquid raw material was foamed and filled in the cavity, the shaping mold was heated, and flexible foam (a pad main body) made of foamed polyurethane in a thickness of about 100 mm was formed and cured. Thus, a seat pad according to experimental example 1 was obtained in which the three-dimensional mesh-like body was integrally formed on the front surface side of the pad main body, a vent hole was formed from the three-dimensional mesh-like body to the back surface, and the coarse blanket cloth was integrally formed on the back surface.

Experimental Example 2

A seat pad according to experimental example 2 was obtained in which the coarse blanket cloth was integrally formed on the back surface of the pad main body using a shaping mold similarly configured as experimental example 1, except that the partitioning wall is not provided on the lower mold and the projection is not provided on the upper mold. The seat pad according to experimental example 2 is different from the seat pad according to experimental example 1 in that the three-dimensional mesh-like body and the vent hole are not provided on the pad main body.

Experimental Example 3

A seat pad according to experimental example 3 was obtained in which a cylindrical three-dimensional mesh-like body (made of a felt sheet) having a diameter of 70 mm and a height of 100 mm was inserted into four holes in a circular shape in the cross section (the inner diameter was 70 mm) on flexible foam made of foamed polyurethane (a pad main body in a thickness of 100 mm having a coarse blanket cloth integrally formed on the back surface) in which the holes were penetrated in the thickness direction as spaced at a predetermined gap. It is noted that a skin is formed on the wall surface of the hole on the pad main body. Moreover, the gap of the three-dimensional mesh-like body of the seat pad according to experimental example 3 is set the same as the gap of the three-dimensional mesh-like body of the seat pad according to experimental example 1.

Experimental Example 4

After four cylindrical three-dimensional mesh-like bodies (made of a felt sheet) having a diameter of 70 mm and a height of 100 mm were erected on the molding face of the lower mold of a shaping mold as spaced at a predetermined gap, a liquid raw material of a polyurethane was poured onto the molding face of the lower mold, and the upper mold provided with a coarse blanket cloths as a backing cloth was closed. The liquid raw material was foamed and filled in the cavity, the shaping mold was heated, and flexible foam (a pad main body) made of foamed polyurethane in a thickness of about 100 mm was formed and cured. Thus, a seat pad according to experimental example 4 was obtained in which the three-dimensional mesh-like bodies were integrally formed along the thickness direction of the pad main body and the coarse blanket cloth was integrally formed on the back surface. It is noted that the gap of the three-dimensional mesh-like body of the seat pad according to experimental example 4 is set the same as the gap of the three-dimensional mesh-like body of the seat pad according to experimental example 1.

(Preparation of Test Specimens)

The seat pads according to the experimental examples were cut into the size of a length of 380 mm, a with of 380 mm, and a thickness of 50 mm in such a manner that the three-dimensional mesh-like body was included, and test specimens were prepared. However, since the three-dimensional mesh-like body is not held on the pad main body in the seat pad according to experimental example 2, the test specimen according to experimental example 2 does not include the three-dimensional mesh-like body.

(Measurement of Density)

The mass (the density) of the test specimens per unit volume was measured. It is noted that for the mass of the three-dimensional mesh-like body included in the test specimens, the mass was 20 g in experimental example 1, 0 g in experimental example 2, and 38 g in experimental examples 3 and 4.

(Measurement of Hardness)

In compliance with JASO B408 (JIS K6401 in version 2011), the test specimens were pressed in the vertical direction (the thickness direction) in a strain amount 75% of the initial thickness using a pressure plate in a diameter of 200 mm, the load was immediately removed, and then the test specimens were immediately pressed in a strain amount 25% of the initial thickness. A load (a hardness of 25%) was read after a lapse of 20 seconds subsequent to a standstill. Subsequently, the test specimens were pressed in a strain amount 50% of the initial thickness, and a load (a hardness of 50%) was read after a lapse of 20 seconds subsequent to a standstill.

(Compression Deflection)

In compliance with JASO B408 (JIS K6401 in version 2011), an initial load of 5 N was applied to the test specimens using a pressure plate in a diameter of 200 mm, and the thickness (the initial thickness) was measured. The center point on the pressure plane at this time was set to the origin point (the coordinates), a pressure was applied and reduced at a velocity of 150 mm/minute, and a deflection and the coefficient of a hysteresis loss were determined with respect to the load.

Figure 11:
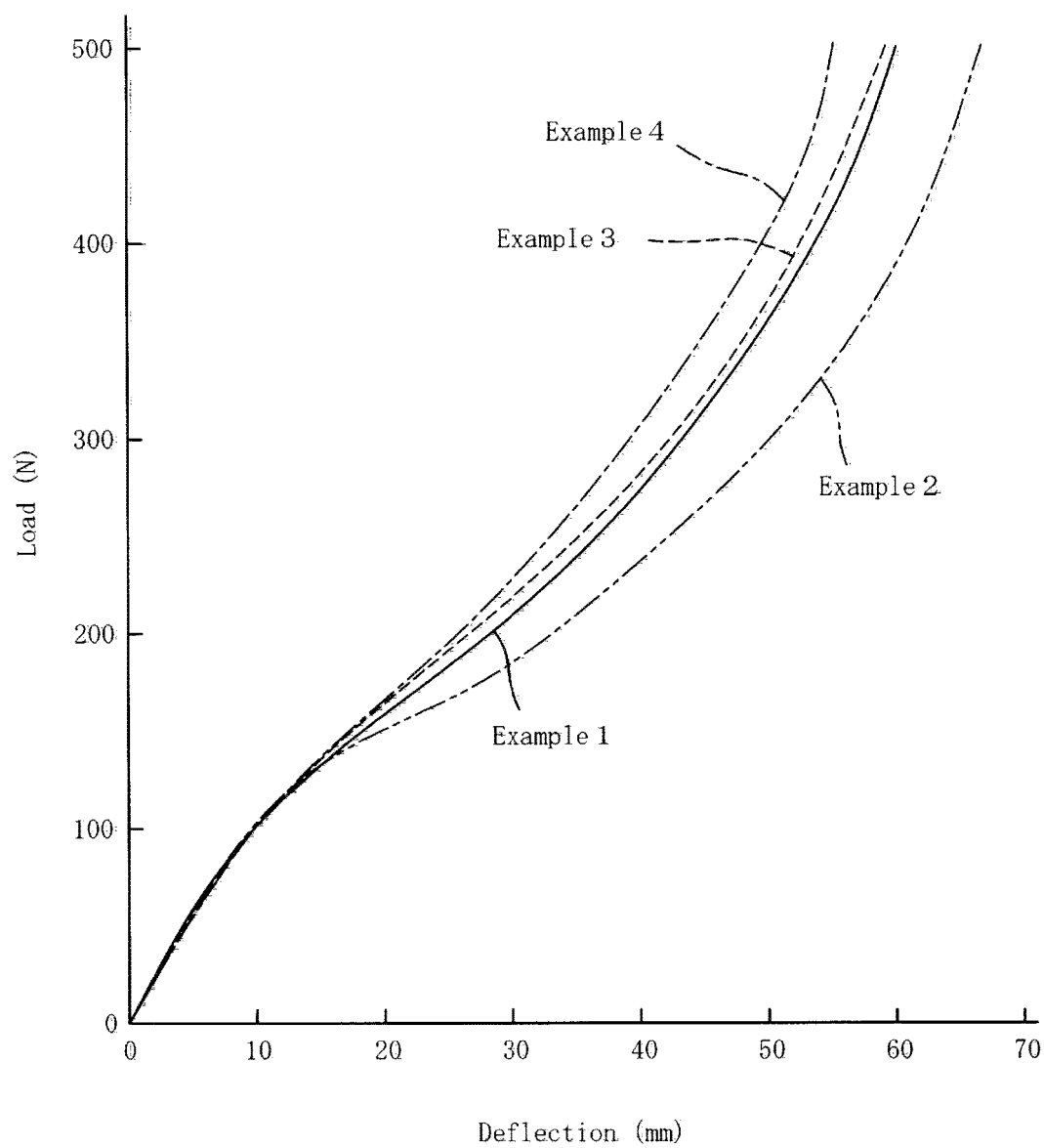
FIG. 11 It is compression deflection curves of seat pads according to experimental examples.

Table 1 is a list of the density of the test specimens (the seat pads) of the experimental examples, hardnesses of 25% and 50%, and the coefficient of a hysteresis loss, and FIG. 11 is compression deflection curves when the test specimens according to the experimental examples are pressed in the vertical direction (the thickness direction).

TABLE

|  |  | Example 1 | Example 2 | Example 3 | Example 4 |
|---|---|---|---|---|---|
| Density | (kg/m$^3$) | 42 | 43 | 42 | 42 |
| Hardness(25%) | (N) | 166 | 150 | 171 | 172 |
| Hardness(50%) | (N) | 323 | 275 | 340 | 361 |
| Coefficient of hystereisis loss | (%) | 25 | 21 | 29 | 28 |

It is revealed from Table 1 and FIG. 11 that experimental example 2 is the softest among the test specimens at this time and the slope of the compression deflection curve is the smallest. Moreover, it is revealed that experimental example 4 is the hardest among the test specimens at this time and the slope of the compression deflection curve is the greatest. This is because experimental example 2 does not include the three-dimensional mesh-like body, and in experimental example 4, the liquid raw material of flexible foam is filled in the three-dimensional mesh-like body to form the hardened layer on the three-dimensional mesh-like body and the three-dimensional mesh-like body is integrally formed with (attached to) the pad main body in the thickness direction.

Furthermore, it is revealed from Table 1 and FIG. 11 that experimental example 3 is softer than experimental example 4 and the slope of the compression deflection curve is also smaller. This is because in experimental example 3, the three-dimensional mesh-like body is inserted into the holes on the flexible foam made of foamed polyurethane (the pad main body) through which the holes are penetrated in the thickness direction, so that experimental example 3 is different from experimental example 4 in that the hardened layer is not included which the liquid raw material of flexible foam is filled in the three-dimensional mesh-like body and hardened.

It is revealed that experimental example 1 is softer than experimental example 3 and the slope of the compression deflection curve is also smaller. This is because in experimental example 1, the liquid raw material is foam-molded in the state in which the three-dimensional mesh-like body is inserted into the inside of the partitioning wall, so that it is possible to prevent the liquid raw material from contacting the side face of the three-dimensional mesh-like body to form the hardened layer, and it is possible to prevent a skin from being formed on the boundary between the three-dimensional mesh-like body and the pad main body. Moreover, it was revealed in experimental example 1 that the three-dimensional mesh-like body is disposed on the front surface side of the pad main body, so that the coefficient of a hysteresis loss can be made smaller than experimental examples 3 and 4 in which the three-dimensional mesh-like body is disposed along the thickness direction of the pad main body.

As described above, according to experimental example 1, the hardness was enabled to come close to experimental example 2 in which the three-dimensional mesh-like body is not included as compared with experimental examples 3 and 4 in which the three-dimensional mesh-like body is held on the pad main body. Therefore, according to experimental example 1, it is apparent that the air permeability as well as the cushioning property and the vibration absorbing property can be secured by holding the three-dimensional mesh-like body on the pad main body.

As described above, the present invention is described based on the embodiments. However, the present invention is not limited to the foregoing embodiments at all, and it can be easily conjectured that the present invention can be improved and modified in the scope not deviating from the teachings of the present invention. For example, the numbers and positions of the three-dimensional mesh-like bodies 3, 4, 23, 43, 53, 63, 73, and 83 disposed on the seat pads 1, 21, and 81 can be appropriately set.

In the foregoing embodiments, the seat pad (a front cushion pad) used for the seating portion of the front seat of an automobile is described. However, the present invention is not necessarily limited thereto, and it is of course possible that this technique is applied to other seat pads. The other seat pads include seat pads used for the backrest portion of the front seat of an automobile and the seating portion or the backrest portion of a rear seat, for example. Moreover, other than the seats of the automobile, it is of course possible that the present invention is applied to seat pads used for the seats of vehicles such as ships and aircrafts and for furniture seats.

In the foregoing embodiments, the case is described where the three-dimensional mesh-like bodies 3, 4, 23, 43, 53, 63, 73, and 83 are formed in a rectangular parallelepiped shape or in a cylindrical shape. However, the present invention is not necessarily limited thereto, and it is of course possible that the three-dimensional mesh-like body is set in a given shape according to the size or the shape of the seat pad.

In the foregoing embodiments, the case is described where the vent holes 2c, 2d, 22b, and 82b are formed in a circular shape in the cross section or in a rectangular shape in the cross section. However, the present invention is not necessarily limited thereto, and the cross sectional form of the vent hole can be appropriately set.

In the foregoing embodiments, the case is described where a single vent hole is formed on the back surface side of a single three-dimensional mesh-like body. However, the present invention is not limited thereto. It is of course possible that two or more of vent holes are provided on the back surface side of a single three-dimensional mesh-like body, although depending on the size of the three-dimensional mesh-like body.

In the foregoing embodiments, the case is described where the cylindrical partitioning walls 31, 41, 51, 61, and 71 are disposed on the lower mold 11. However, the present invention is not necessarily limited thereto, and the shape of the partitioning wall is appropriately set according to the shape of the three-dimensional mesh-like body.

In the foregoing embodiments, the case is described where the partitioning walls 31, 41, 51, 61, and 71 are integrally formed with the lower mold 11. However, the present invention is not necessarily limited thereto, and it is of course possible that the partitioning wall is formed as a separate member from the lower mold 11 and the partitioning wall is disposed and fixed to the lower mold 11. Moreover, it is of course possible that the partitioning wall is detachably fixed to the lower mold 11. In the case where the partitioning wall is detachably fixed to the lower mold 11, it is possible that the seat pad molded using the shaping mold is removed and the partitioning wall is integrally formed with the seat pad and removed out of the shaping mold. In this case, the partitioning wall is removed from the seat pad removed out of the mold, and the seat pad is completed.

In the foregoing fourth embodiment and the fifth embodiment, the case is described where three notch portions 51b and three notch portions 61b are formed on the partitioning walls 51 and 61, respectively. However, the present invention is not limited thereto. The number of the notch portions can be appropriately set according to the shape and size of the three-dimensional mesh-like body, for example.

Although the description is omitted in the foregoing embodiments, it is of course possible that a core mold (not illustrated) is provided on the upper mold 12 depending on the type of the seat pad. For example, the core mold is provided as vertically movable by a drive unit (not illustrated) provided on the upper mold 12, and the core mold is set in such a manner that the core mold is removed out of the upper mold 12 and opened by being vertically moved using the drive unit.

In the foregoing seventh embodiment, the case is described where the tip end (the contact face) of the projection 91 is set greater than the back surface of the three-dimensional mesh-like body 83. However, the present invention is not limited thereto.

The relationship between the size of the tip end (the contact face) of the projection and the size of the back surface of the three-dimensional mesh-like body can be freely set. For example, it is of course possible that the size of the tip end (the contact face) of the projection is set to the same size as the size of the back surface of the three-dimensional mesh-like body.

Moreover, it is of course possible that in the case where the size of the tip end (the contact face) of the projection and is set to the same size as the size of the back surface of the three-dimensional mesh-like body or in the case where the tip end (the contact face) of the projection is set greater than the back surface of the three-dimensional mesh-like body, the partitioning wall is provided on the lower mold 11 to adjust the position and size of the hardened side face layer formed on the side face of the three-dimensional mesh-like body.

It is noted that the foregoing embodiments also disclose the following invention.

A seat pad A1 characterized by including: a pad main body formed of flexible foam made of a foamed synthetic resin; a recess (2*a*, 2*b*, 22*a*, 82*a*) provided on a front surface of the pad main body; a vent hole (2*c*, 2*d*, 22*b*, 82*b*) in which one end is opened on a bottom face of the recess and is penetrated through the pad main body in thickness direction and the other end is opened on a back surface of the pad main body; and a three-dimensional mesh-like body formed of a plurality of three-dimensionally entangled fibers and set inside the recess. In the seat pad, a hardened layer is included that a liquid raw material of flexible foam is hardened between fibers of the three-dimensional mesh-like body to attach the three-dimensional mesh-like body to the pad main body.

In the seat pad A1, a seat pad A2 is characterized in that the hardened layer includes a hardened back surface layer (5, 25, 45, 55, 65, 75) that attaches a back surface of the three-dimensional mesh-like body to the bottom face of the recess.

In the seat pad A1 or A2, a seat pad A3 is characterized in that the hardened layer includes a hardened side face layer (6, 46, 56, 66, 76, 84) that attaches a side face of the three-dimensional mesh-like body to an inner side face of the recess.

In the seat pad A3, a seat pad A4 is characterized in that the hardened side face layer is formed except in a predetermined depth from a front surface of the three-dimensional mesh-like body to a portion not reaching the back surface of the three-dimensional mesh-like body.

In the seat pad A3 or A4, a seat pad A5 is characterized in that the hardened side face layer includes an entered portion (56*a*, 66*a*, 76*a*) that a part of an edge on a front surface side of the three-dimensional mesh-like body is entered into a back surface side of the three-dimensional mesh-like body.

According to the foregoing seat pad A1, the pad main body is formed of flexible foam made of a foamed synthetic resin, and the recess is provided on the front surface of the pad main body. The vent hole is penetrated through the pad main body in the thickness direction, the vent hole including one end opened on the bottom face of the recess and the other end opened on the back surface of the pad main body. The three-dimensional mesh-like body formed of a plurality of three-dimensionally entangled fibers is set inside the recess, so that the air permeability of the pad main body in the thickness direction can be secured because of the three-dimensional mesh-like body and the vent hole. Accordingly, it is possible to suppress a sweaty feeling.

Moreover, the hardened layer that the liquid raw material of flexible foam is hardened between the fibers of the three-dimensional mesh-like body attaches the three-dimensional mesh-like body to the pad main body. The hardened layer attaches the three-dimensional mesh-like body to the pad main body, so that an effect is exerted that it is possible that the three-dimensional mesh-like body is not easily displaced with respect to the pad main body.

According to the seat pad A2, since the hardened back surface layer attaches the back surface of the three-dimensional mesh-like body to the bottom face of the recess, the three-dimensional mesh-like body is disposed between the front surface of the three-dimensional mesh-like body and the hardened back surface layer. As a result, in addition to the effect of the seat pad A1, an effect is exerted that it is possible that the person who takes a seat on the front surface of the three-dimensional mesh-like body hardly experiences an uncomfortable feeling caused by the hardened back surface layer, which is cured.

According to the seat pad A3, the hardened side face layer attaches the side face of the three-dimensional mesh-like body to the inner side face of the recess. Therefore, in addition to the effect of the seat pad A1 or A2, effects are exerted that it is possible that the three-dimensional mesh-like body is not easily displaced in the thickness direction with respect to the pad main body when the pad main body and the three-dimensional mesh-like body pressed in the thickness direction of the seat pad are restored and it is possible that the three-dimensional mesh-like body is not easily sunk.

According to the seat pad A4, the hardened side face layer is formed except in a predetermined depth from the front surface of the three-dimensional mesh-like body to a portion not reaching the back surface of the three-dimensional mesh-like body. Although the hardened side face layer becomes harder than the three-dimensional mesh-like body or the pad main body because the liquid raw material is hardened, the hardened side face layer is not provided in a predetermined depth from the front surface of the pad main body to a portion not reaching the bottom face of the recess. Therefore, in addition to the effect of the seat pad A3, a hard hardened side face layer is not provided on the front surface of the pad main body, so that effects are exerted that it is possible that the touch of the front surface of the pad main body is improved and the person who takes a seat hardly experiences an uncomfortable feeling.

According to the seat pad A5, the hardened side face layer includes the entered portion that a part of the edge on the front surface side of the three-dimensional mesh-like body is entered into the back surface side of the three-dimensional mesh-like body, so that it is possible to reduce the area of the hardened side face layer by the entered portion. The area of the hardened side face layer harder than the three-dimensional mesh-like body or the pad main body can be reduced, as compared with the case where the entered portion is not formed, so that in addition to the effect of the seat pad A3 or A4, an effect is exerted that it is possible that an uncomfortable feeling experienced by the person who takes a seat is further reduced and comfortableness to sit is improved.

The invention claimed is:

1. A method of manufacture of a seat pad comprising the steps of:
disposing a mesh body wherein a three-dimensional mesh body formed of a plurality of three-dimensionally entangled fibers is disposed on a molding face of a lower mold onto which a liquid raw material of foam made of a synthetic resin is poured;

forming a cavity wherein while the cavity is formed as an upper mold is laid over the lower mold on which the three-dimensional mesh body is disposed in the step of disposing the mesh body, a contact face of a projection projected on the upper mold toward the cavity is contacted with a back surface of the three-dimensional mesh body, and the three-dimensional mesh body is fixed in the cavity; and molding wherein the liquid raw material is foamed in the cavity formed in the step of forming the cavity to mold a pad main body formed of the foam and the three-dimensional mesh body is attached and fixed to a front surface of the pad main body;

wherein the lower mold includes a tubular partitioning wall erected on the molding face and having an opened top end;

wherein in the step of disposing the mesh body, the three-dimensional mesh body is inserted into an inside of the partitioning wall and the three-dimensional mesh body is disposed on the molding face;

wherein the partitioning wall includes a notch portion notched from the top end toward the molding face along a height direction; and wherein the notch has a lower end thereof formed in an arc shape.

2. The method of manufacture of a seat pad according to claim 1, wherein the back surface of the three-dimensional mesh body is set greater than the contact face of the projection contacting the back surface of the three-dimensional mesh body.

3. The method of manufacture of a seat pad according to claim 2, wherein the partitioning wall has a height from the molding face to a top end of the partitioning wall set smaller than a height from a front surface to the back surface of the three-dimensional mesh body inserted into the inside of the partitioning wall.

* * * * *